(12) United States Patent
Yamaguchi

(10) Patent No.: US 9,219,626 B2
(45) Date of Patent: Dec. 22, 2015

(54) DATA TRANSMISSION SYSTEM AND DATA TRANSMISSION METHOD

(71) Applicant: NEC Corporation, Tokyo (JP)

(72) Inventor: Hiroshi Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/494,801

(22) Filed: Sep. 24, 2014

(65) Prior Publication Data

US 2015/0085956 A1    Mar. 26, 2015

(30) Foreign Application Priority Data

Sep. 24, 2013  (JP) ................. 2013-196450

(51) Int. Cl.
*H04B 3/26* (2006.01)
*H04L 25/03* (2006.01)
*H04L 7/00* (2006.01)

(52) U.S. Cl.
CPC ........ *H04L 25/03853* (2013.01); *H04L 7/0037* (2013.01)

(58) Field of Classification Search
CPC .............. H04B 3/00; H04B 3/20; H04B 3/26; H04B 3/28; H04B 3/30; H04B 3/32; H04B 3/42; H04B 3/50; H04B 15/00
USPC .......... 375/295, 316, 296, 288, 289
See application file for complete search history.

(56) References Cited

U.S. PATENT DOCUMENTS

| | | | |
|---|---|---|---|
| 7,161,986 B2* | 1/2007 | Yamaguchi ................ | 375/259 |
| 7,786,785 B2* | 8/2010 | Kanda et al. ............. | 327/291 |
| 2002/0176236 A1* | 11/2002 | Iguchi et al. ............. | 361/753 |
| 2003/0103574 A1 | 6/2003 | Yamaguchi | |
| 2004/0071219 A1* | 4/2004 | Vorenkamp et al. ......... | 375/257 |
| 2005/0104679 A1* | 5/2005 | Blednov ................. | 333/32 |
| 2007/0242757 A1* | 10/2007 | Schley-May et al. ........ | 375/257 |
| 2009/0212886 A1* | 8/2009 | Satoh et al. ............. | 333/204 |
| 2011/0241778 A1* | 10/2011 | Chujo et al. ............. | 330/253 |

FOREIGN PATENT DOCUMENTS

JP       3719413       11/2005

\* cited by examiner

*Primary Examiner* — Siu Lee

(74) *Attorney, Agent, or Firm* — Young & Thompson

(57) ABSTRACT

In order to make it possible to suppress attenuation of a data signal waveform without extra power consumption in high-speed transmission by using a high-speed clock, a data transmission system of the present invention includes a sending unit that outputs a reference signal generated by delaying a clock signal and a modulation signal which is either a signal the phase of which is delayed with respect to the reference signal in accordance with a state of a data signal or the clock signal, a transmission unit that transmits the reference signal and modulation signal, a peaking unit that suppress a development of peaking by applying inductor peaking to a signal on a transmission path, and a receiving unit that demodulates the data signal by detecting a phase difference between the reference signal and the modulation signal and outputs information on the data signal.

7 Claims, 20 Drawing Sheets

DATA TRANSMISSION SYSTEM AND DATA TRANSMISSION METHOD

This application is based upon and claims the benefit of priority from Japanese Patent Application No. 2013-196450, filed on Sep. 24, 2013, the disclosure of which is incorporated herein in its entirety by reference.

TECHNICAL FIELD

The present invention relates to a data transmission system and a data transmission method. More particularly, the present invention relates to a data transmission system and a data transmission method which transmit data by using phase differences of signals.

BACKGROUND ART

Recent years, data quantity transmitted on transmission lines connecting information processing apparatuses has increased. In order to cope with the data quantity increase on transmission lines, it is effective to transmit data in a high frequency signal. For transmission of a high frequency signal, a high frequency clock signal is used.

In a data transmission circuit which uses a high frequency clock signal, peaking developing on a data signal waveform causes problems such that the data signal waveform is distorted, a voltage greater than an allowable voltage is applied to a circuit, and so on. On a conventional transmission line, a high frequency component in a transmission signal is likely to be attenuated. Accordingly, when attenuation of a transmission signal is substantial, the transmission signal needs to be amplified up to an amplitude high enough for demodulation.

FIG. 17 is a diagram illustrating data transmission waveforms in a conventional binary data transmission. The data transmission waveforms in FIG. 17 illustrates exactly the behavior of a flip-flop, in which input data DIN is sampled according to a clock signal CLK. A waveform of an output signal DOUT in a conventional binary data transmission is created by delaying a data input DIN temporally, and the output signal DOUT created in such a way propagates on a transmission line. The output signal DOUT reaches the reception side as a rounded waveform the high frequency component of which is, in the propagation process, attenuated due to frequency response characteristics of the transmission line. The output signal DOUT is sampled according to a clock signal in a similar manner to the above-described behavior of a flip-flop and restored to the original data.

On a conventional transmission line, a transmission signal is attenuated as the signal propagates through the transmission line, causing the transmitted waveform thereof to be rounded and rising edges and falling edges thereof to become less apparent. For example, when the input data DIN in FIG. 17 is rounded in the propagation process and peaking develops between two peaks (signals of "1"), the two peaks may join together, making it difficult to demodulate an output signal DOUT accurately. Accordingly, it is preferable to amplify the transmission signal by an amplification device installed on the transmission line or in a receiving unit before the transmission signal becomes too much attenuated to be demodulated.

FIG. 18 is a block diagram illustrating a data transmission system 10 disclosed in Patent Literature 1 (Japanese Patent No. 3719413). The data transmission system 10 of Patent Literature 1 includes a sending unit 110 and a receiving unit 120. The sending unit 110 is connected to the receiving unit 120 by a reference signal transmission line 140 through which a reference signal REF is transmitted and a modulation signal transmission line 150 through which a data signal DAT is transmitted.

In the data transmission system 10 of Patent Literature 1, the reference signal REF and modulation signal DATA are transmitted from the sending unit 110, which inputs input data DIN and a clock signal CLK, to the receiving unit 120 through the reference signal transmission line 140 and the modulation signal transmission line 150, respectively. The receiving unit 120 receives the reference signal REF and modulation signal DATA and outputs an output signal DOUT by demodulating the signals.

FIG. 19 is a time chart of the data transmission system of Patent Literature 1. In the data transmission system of Patent Literature 1, information indicated by "0" and "1" in the amplitude direction in the input data DIN is modulated to information in the phase direction of the reference signal REF and modulation signal DATA in the sending unit 110. The transmitted signal is, after the phase differences are converted to negative pulses S (phase lag signal) and R (phase lead signal) by a phase detection unit in the receiving unit 120, restored to a data string of "0" and "1" by an RS latch (S: Set, R: Reset).

FIG. 20 is a time chart illustrating the phase differences between the reference signal REF and the modulation signal DATA illustrated in the time chart in FIG. 19 in an accentuating manner. As illustrated in FIG. 20, the input data DIN is modulated so that the phase of the modulation signal DATA (solid line) leads with respect to the reference signal REF (dotted line) when the input data DIN is 0, and the phase of the modulation signal DATA (solid line) is delayed with respect to the reference signal REF (dotted line) when the input data DIN is 1.

A system which transmit information in input data DIN by using phase differences of a modulation signal DATA with respect to a reference signal REF as disclosed in Patent Literature 1 is also disclosed in Patent Literature 2 (Japanese Patent No. 3982517) and Patent Literature 3 (Japanese Patent Application Laid-Open No. 2011-77791).

In an ordinary transmission line, attenuation of a signal increases as a higher frequency is used, which causes a problem such that it becomes difficult to transmit a signal as a higher frequency is used for the transmission. In an ordinary data transmission system, there is also a problem such that signal transmission becomes difficult when peaking develops. In particular, in a general transmission in which information is represented by binary amplitude, because a signal includes a plurality of frequency elements, interference is likely to be caused between consecutive codes when the amplitude of the signal increases at a particular frequency due to peaking. Although it may be possible to insert an amplifier on the transmission path to eliminate effects of interference between codes, power consumption will increase due to the signal amplification.

With the data transmission systems of Patent Literatures 1 to 3, transmission characteristics such that interference between codes does not cause ill effects even when higher frequency is used may be achieved. However, even with the data transmission systems of Patent Literatures 1 to 3, inserting a general amplifier on the transmission path causes extra power consumption to be required.

Accordingly, an object of the present invention is to provide a data transmission system which makes it possible to suppress attenuation of a waveform of data signal without extra power consumption in a high-speed transmission by a high-speed clock.

SUMMARY

A data transmission system of the present invention includes a sending unit that inputs a clock signal and a data signal and outputs a reference signal which is generated by delaying the input clock signal and a modulation signal which is either a signal the phase of which is shifted with respect to the reference signal in accordance with a state of the input data signal or the clock signal, a transmission unit that inputs the reference signal and modulation signal which are output by the sending unit and transmits the input reference signal and modulation signal, a peaking unit that is installed on transmission paths for the reference signal and modulation signal and suppresses a development of peaking by applying inductor peaking to the signals on the transmission paths, and a receiving unit that inputs the reference signal and modulation signal via the transmission unit, demodulates the data signal by detecting phase differences between the input reference signal and modulation signal, and outputs information on the data signal.

In a data transmission method of the present invention, a clock signal and a data signal are input, a reference signal which is generated by delaying the input clock signal and a modulation signal which is either a signal the phase of which is shifted with respect to the reference signal in accordance with a state of the input data signal or the clock signal are generated, the reference signal and modulation signal are transmitted, a development of peaking is suppressed by applying inductor peaking, to the signals on the transmission paths for the reference signal and modulation signal, the data signal is demodulated by detecting phase differences between the reference signal and modulation signal, and information on the demodulated data signal is output.

BRIEF DESCRIPTION OF THE DRAWINGS

Exemplary features and advantages of the present invention will become apparent from the following detailed description when taken with the accompanying drawings in which.

EXEMPLARY EMBODIMENT

Preferred embodiments of the present invention will be described below with reference to the accompanying drawings. Although exemplary embodiments which will be described below include technically preferable limitations for embodying the present invention, the scope of the invention is not necessarily limited to the exemplary embodiments below.

First Exemplary Embodiment

Configuration

First, a configuration of a data transmission system 1 according to a first exemplary embodiment of the present invention will be described below.

Figure 1:
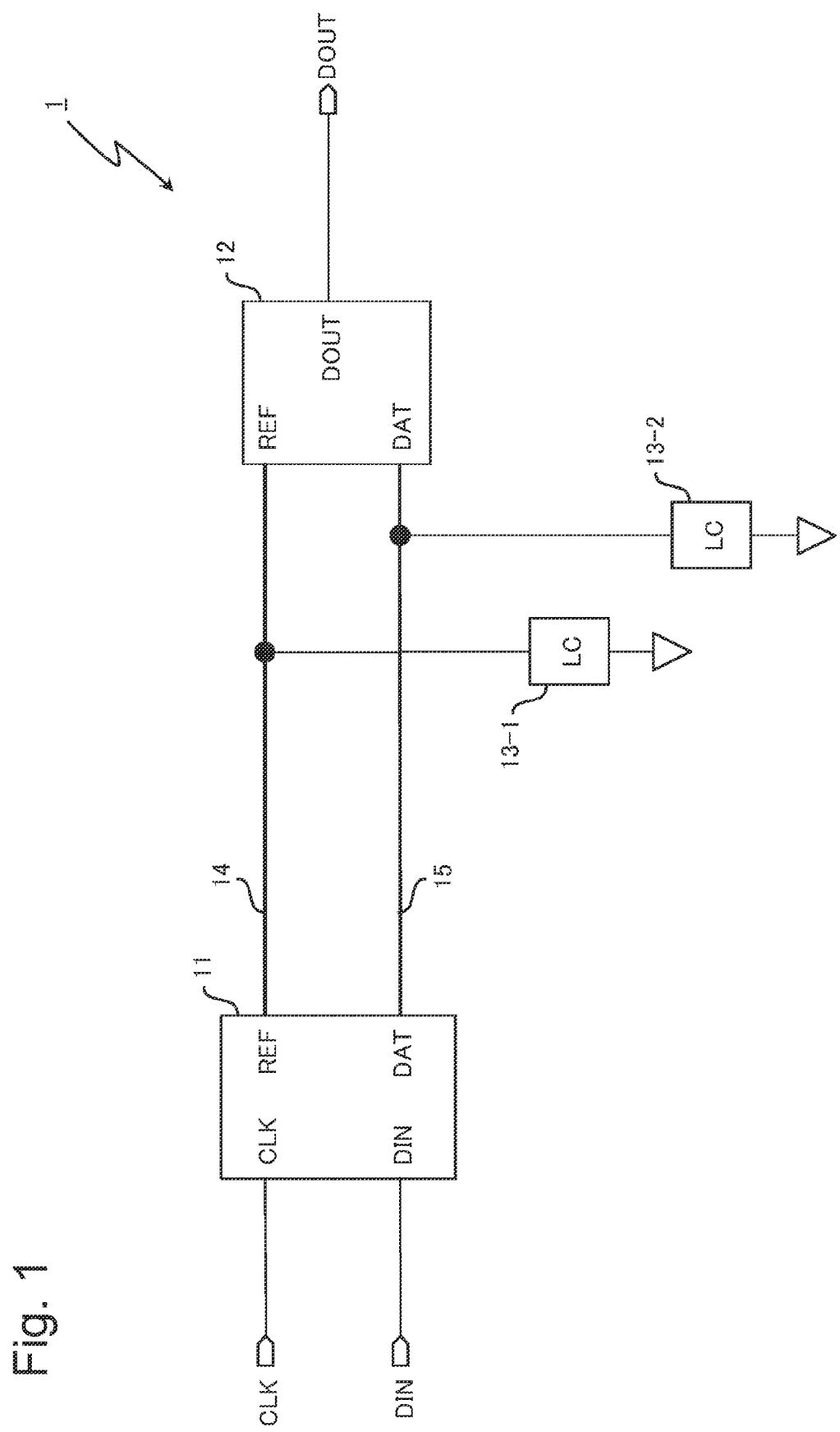
FIG. 1 is a block diagram illustrating a data transmission system according to a first exemplary embodiment of the present invention.

The data transmission system 1 according to the first exemplary embodiment, illustrated in FIG. 1, includes a sending unit 11 (transmitter, sending means), a receiving unit 12 (receiver, receiving means), and an LC parallel resonant circuit 13 (peaking unit, peaking means). The data transmission system 1 according to the first exemplary embodiment also includes a transmission line (transmission unit, transmission means) which connect the sending unit 11 to the receiving unit 12. The transmission line include at least a reference signal transmission line 14 through which a reference signal REF is transmitted and a modulation signal transmission line 15 through which a modulation signal DATA is transmitted.

In general, for a standard circuit which transmits data by using a high-speed clock, peaking develops on a waveform of a transmitted signal. Consequently, a waveform of transmitted data is distorted, or a voltage higher than a withstand voltage is applied to the circuit. A technology for mitigating peaking by using an inductor is referred to as inductor peaking. In exemplary embodiments of the present invention, a means configured to apply inductor peaking to a transmission path in the data transmission system 1 is also referred to as a peaking means, which is configured with passive circuits unless otherwise noted.

(LC Parallel Resonant Circuit)

The LC parallel resonant circuits 13 (13-1 and 13-2) are means connected to inputs of the receiving unit 12 and in which peaking inductors are employed. The LC parallel resonant circuit 13 is connected to each of the reference signal transmission line 14 and the modulation signal transmission line 15. The LC parallel resonant circuit 13 according to exemplary embodiments of the present invention is a resonant circuit which satisfies, at a specific point on a transmission path of the data transmission system, a condition by which an inductance L and a capacitance C resonate. The transmission path of the data transmission system is included in at least either the transmission unit 11, receiving unit 12, or transmission line.

The LC parallel resonant circuit 13 may be inserted into either the transmission unit 11, receiving unit 12, or transmission line as a component. The LC parallel resonant circuit 13 may be configured by using parasitic capacitance or parasitic inductance on either the transmission unit 11, receiving unit 12, or transmission line.

In the first exemplary embodiment, the LC parallel resonant circuit 13 connected to the reference signal transmission line 14 and the LC parallel resonant circuit 13 connected to the modulation signal transmission line 15 are referred to as an LC parallel resonant circuit 13-1 and an LC parallel resonant circuit 13-2, respectively. Though it is preferable that the LC parallel resonant circuits 13-1 and 13-2 have the same configuration, complete likeness is not required.

Figure 2:
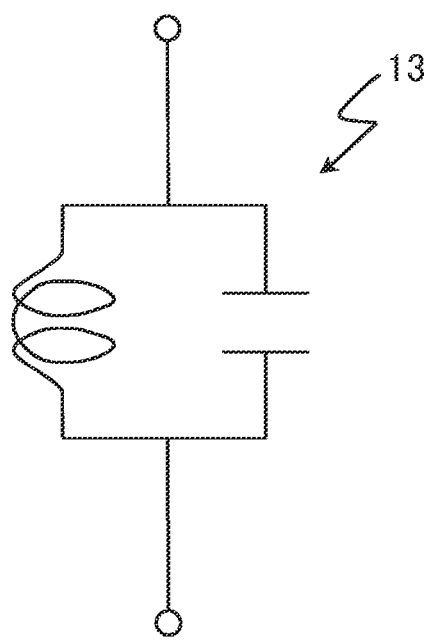
FIG. 2 is a diagram illustrating an example of a circuit configuration of an LC parallel resonant circuit of the data transmission system according to the first exemplary embodiment of the present invention.

FIG. 2 is a schematic diagram illustrating a configuration example of the LC parallel resonant circuit 13. The LC parallel resonant circuit 13 has a circuit configuration in which an inductor (coil) and a capacitor (condenser) are connected in parallel. As described above, when parasitic capacitance on either the transmission unit 11, receiving unit 12, or transmission line is used, only an inductor may be added. When parasitic inductance is overabundant with respect to parasitic capacitance, only a capacitor may be added. Furthermore, the LC parallel resonant circuit 13 may be configured by appending a variable inductor or variable capacitor the setting value of which can be changed.

(Sending Unit)

Figure 3:
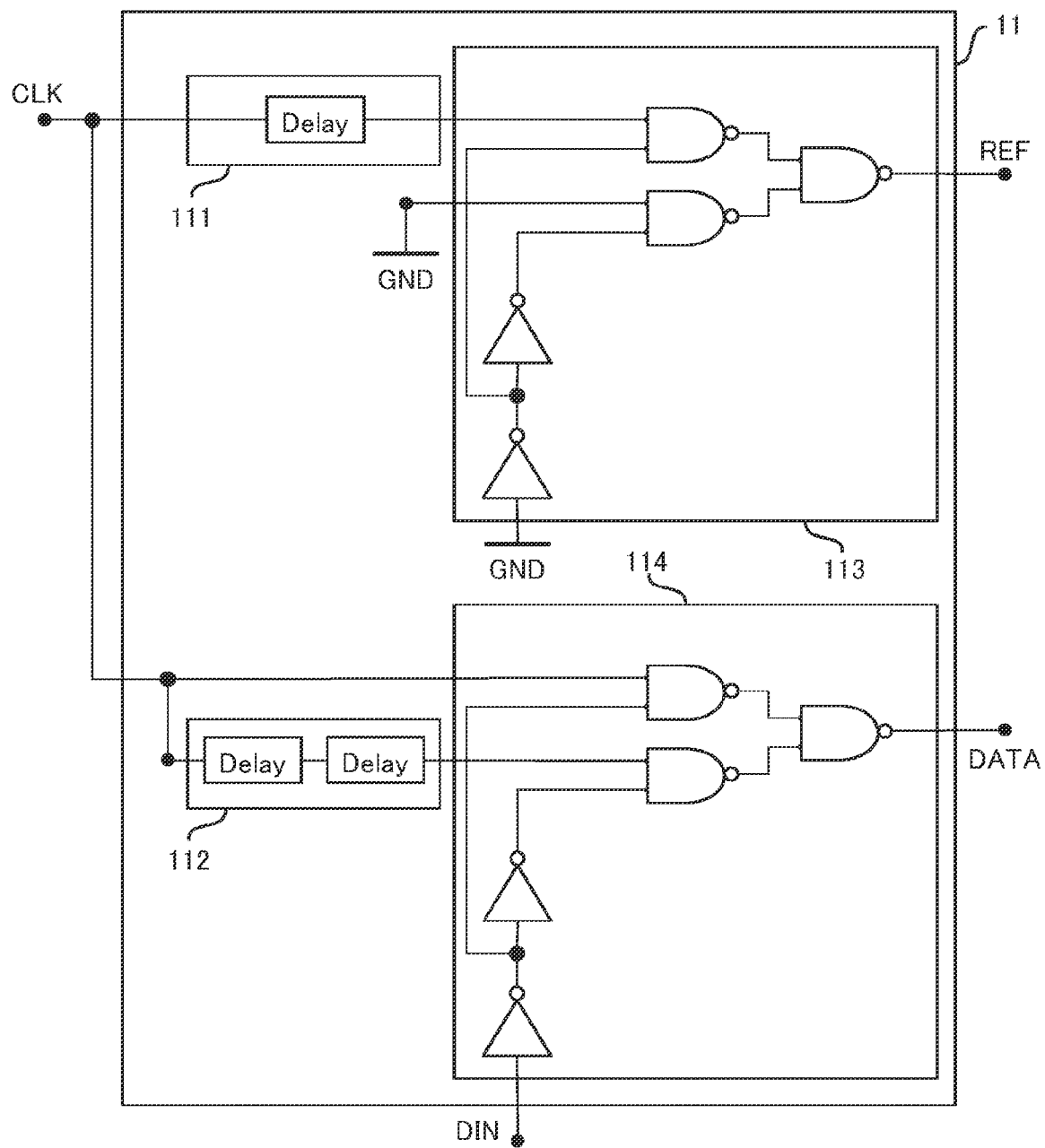
FIG. 3 is a diagram illustrating an example of a circuit configuration of a sending unit of the data transmission system according to the first exemplary embodiment of the present invention.

FIG. 3 is a diagram illustrating, as a circuit diagram, an example of the sending unit 11 of the data transmission system 1 according to the first exemplary embodiment. The circuit configuration illustrated in FIG. 3 is an example. Any change may be applied to the circuit configuration as long as the below-mentioned operation is carried out.

The sending unit 11 includes delay circuits 111 and 112 and selection circuits 113 and 114.

The delay circuit 111 is a first delay circuit that delays a clock signal CLK having an externally-input base frequency by a unit of time and outputs the delayed clock signal.

The delay circuit 112 has a delay time of twice as long as the delay time of the delay circuit 111. The delay circuit 112 is a second delay circuit that delays the clock signal CLK having an externally-input base frequency by two units of time and outputs the delayed clock signal.

The selection circuit 113 is configured as a multiplexer assembled from inverter circuits and NAND circuits as illustrated in FIG. 3. The selection circuit 113 is a first selection circuit that selects the output of the delay circuit 111 at all times and outputs the selected signal as a reference signal REF.

The selection circuit 113 synchronizes the output thereof with the output of the selection circuit 114 by absorbing processing time of the selection circuit 114. Hence, when the selection circuit 114 carries out processing so fast that the processing time is negligible, the output of the delay circuit 111 may be output directly as the reference signal REF without using the output of the selection circuit 113.

The selection circuit 114 is, as with the selection circuit 113 illustrated in FIG. 3, configured as a multiplexer assembled from inverter circuits and NAND circuits. The selection circuit 114 is a second selection circuit that selects either the clock signal CLK or the output signal from the delay circuit 112 depending on input data DIN and outputs the selected signal as a modulation signal DATA.

Figure 20:
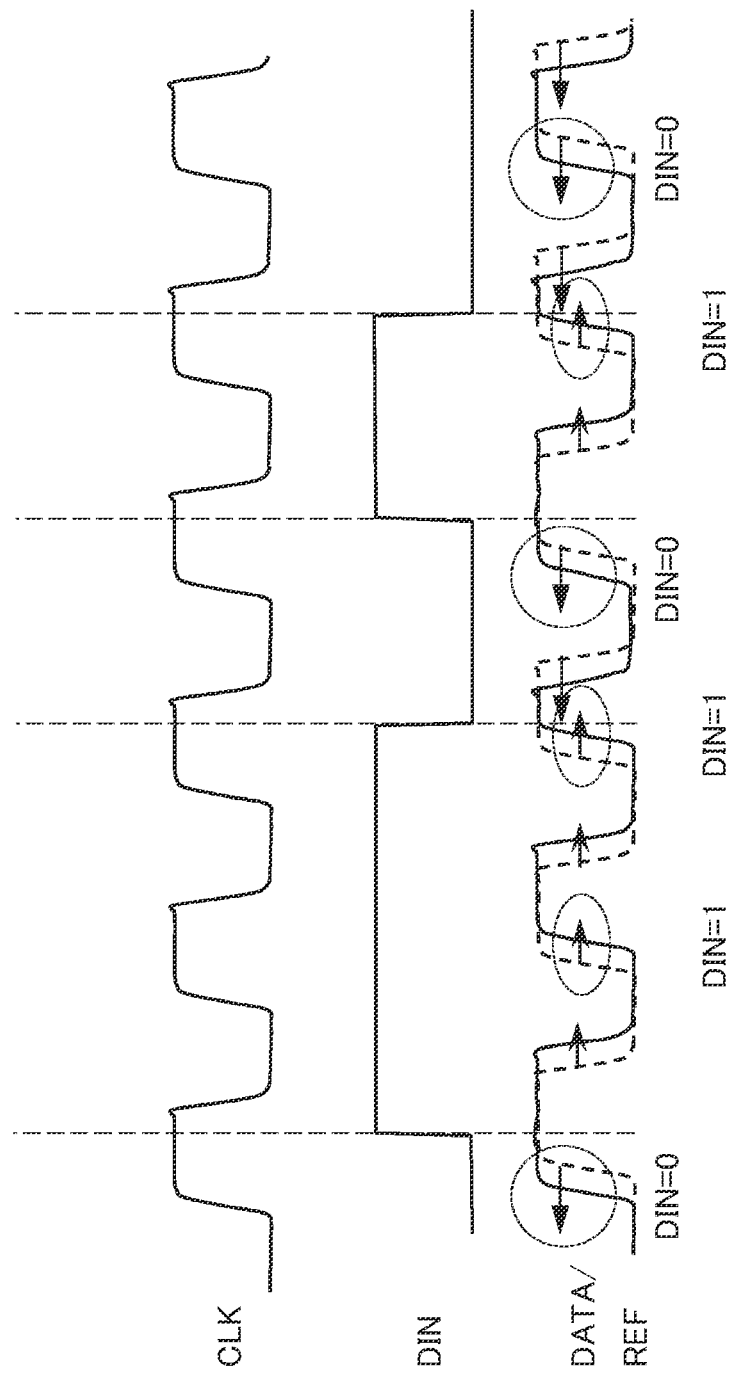
FIG. 20 is a diagram for description of the data transmission waveforms which propagate through the transmission line of Patent Literature 1.

More specifically, the selection circuit 114 inputs the output signal from the delay circuit 112, which is delayed by two units of time with respect to the clock signal CLK, and the clock signal CLK. The selection circuit 114, as illustrated in FIG. 20, selects the output signal of the delay circuit 112 and outputs the selected signal as the modulation signal DATA when the input data DIN is 1.

In other words, when the input data DIN is 0, the phase of the modulation signal DATA leads by a unit of time with respect to the reference signal REF. When the input data DIN is 1, the phase of the modulation signal DATA is delayed by a unit of time with respect to the reference signal REF.

(Receiving Unit)

Figure 4:
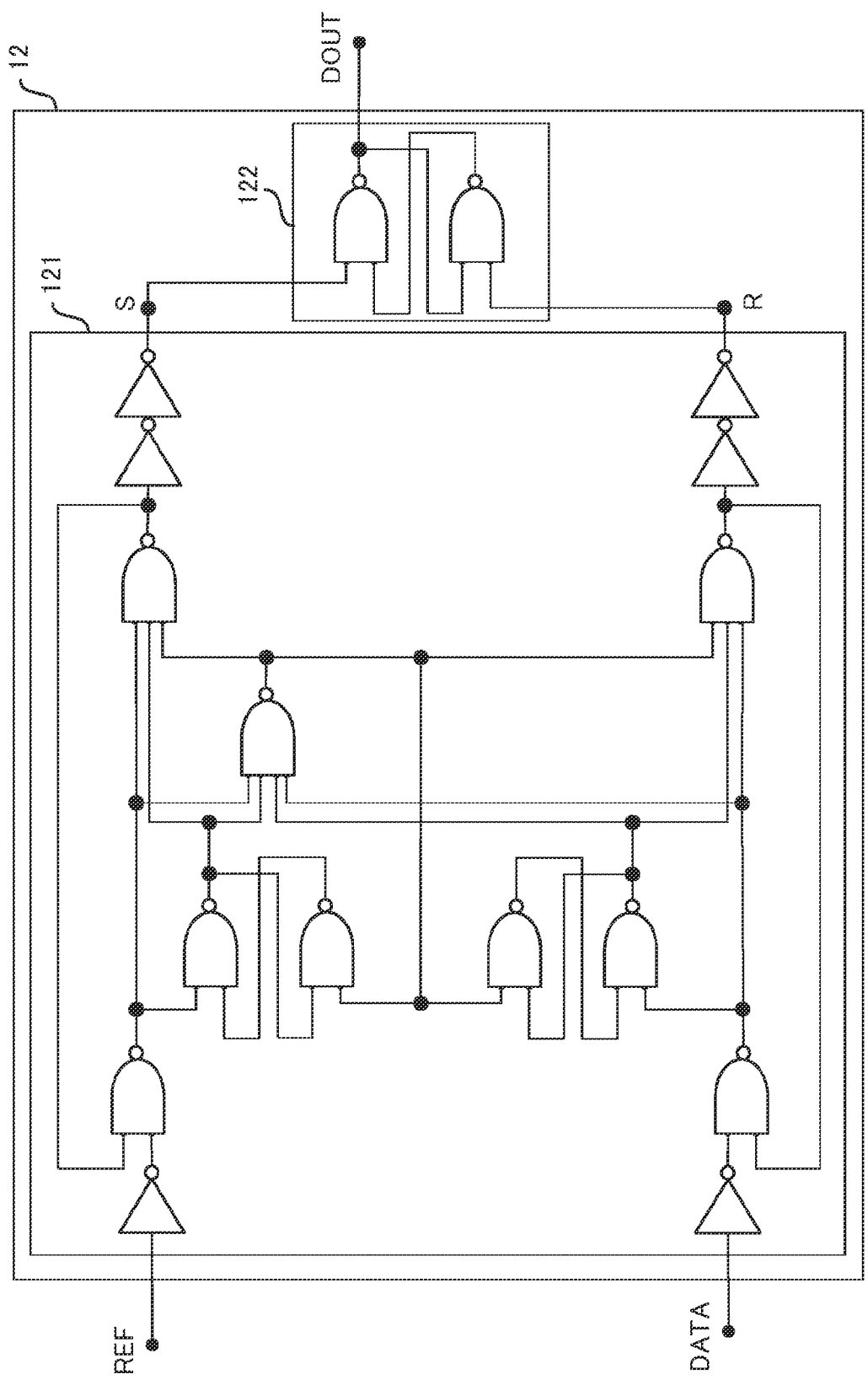
FIG. 4 is a diagram illustrating an example of a circuit configuration of a receiving unit of the data transmission system according to the first exemplary embodiment of the present invention.

FIG. 4 is a diagram illustrating an example of the receiving unit 12 of the data transmission system 1 according to the first exemplary embodiment as a circuit diagram. The circuit configuration illustrated in FIG. 4 is an example. Any change may be applied to the circuit configuration as long as the below-mentioned operation is carried out.

The receiving unit 12 includes a phase comparator 121 and an RS latch 122 (R: Reset, S: Set).

The phase comparator 121 is, as illustrated in FIG. 4, configured by assembling inverter circuits and NAND circuits. The phase comparator 121 inputs the reference signal REF and the modulation signal DATA, and detects a phase difference between the reference signal REF and the modulation signal DATA.

When the phase of the modulation signal DATA leads with respect to the phase of the reference signal REF, the phase comparator 121 outputs a phase lead detection signal R with a pulse width equivalent to the phase difference. When the phase of the modulation signal DATA is delayed with respect to the phase of the reference signal REF, the phase comparator 121 outputs a phase lag detection signal S with a pulse width equivalent to the phase difference.

In other words, when the phase of the modulation signal DATA leads by a unit of time with respect to the reference signal REF, a phase lead detection signal R with a pulse width of a unit of time is output. On the other hand, when the phase of the modulation signal DATA is delayed by a unit of time with respect to the reference signal REF, a phase lag detection signal S with a pulse width of a unit of time is output.

The RS latch 122 is, as illustrated in FIG. 4, configured by assembling NAND circuits. The RS latch 122 inputs the phase lead detection signal R and phase lag detection signal S.

The RS latch 122 is configured so that an output signal terminal DOUT is set to 0 when the phase lead detection signal R is input to the reset input, and the output signal terminal DOUT is set to 1 when the phase lag detection signal S is input to the set input.

(Transmission Line)

The transmission line used in the data transmission system 1 according to the first exemplary embodiment includes a reference signal transmission line 14 through which the reference signal REF is transmitted and a modulation signal transmission line 15 through which the modulation signal DATA is transmitted. The transmission line including the reference signal transmission line 14 and the modulation signal transmission line 15 may be configured as a general transmission line without any particular limitation. For example, a transmission line the impedance of which is controlled, such as a microstrip line structure, stripline structure, and coaxial cable, may be employed. The reference signal transmission line 14 and modulation signal transmission line 15 may be configured as separate transmission lines or may be configured as a single transmission line. The transmission line according to the first exemplary embodiment may, as long as the receiving unit 12 is able to generate the reference signal REF, be configured so as to transmit only the modulation signal DATA.

(Operation)

Next, an operation of the data transmission system according to the first exemplary embodiment of the present invention will be described below.

(Sending Unit)

First, referring to FIG. 5, an operation of the sending unit 11 will be described.

Figure 5:
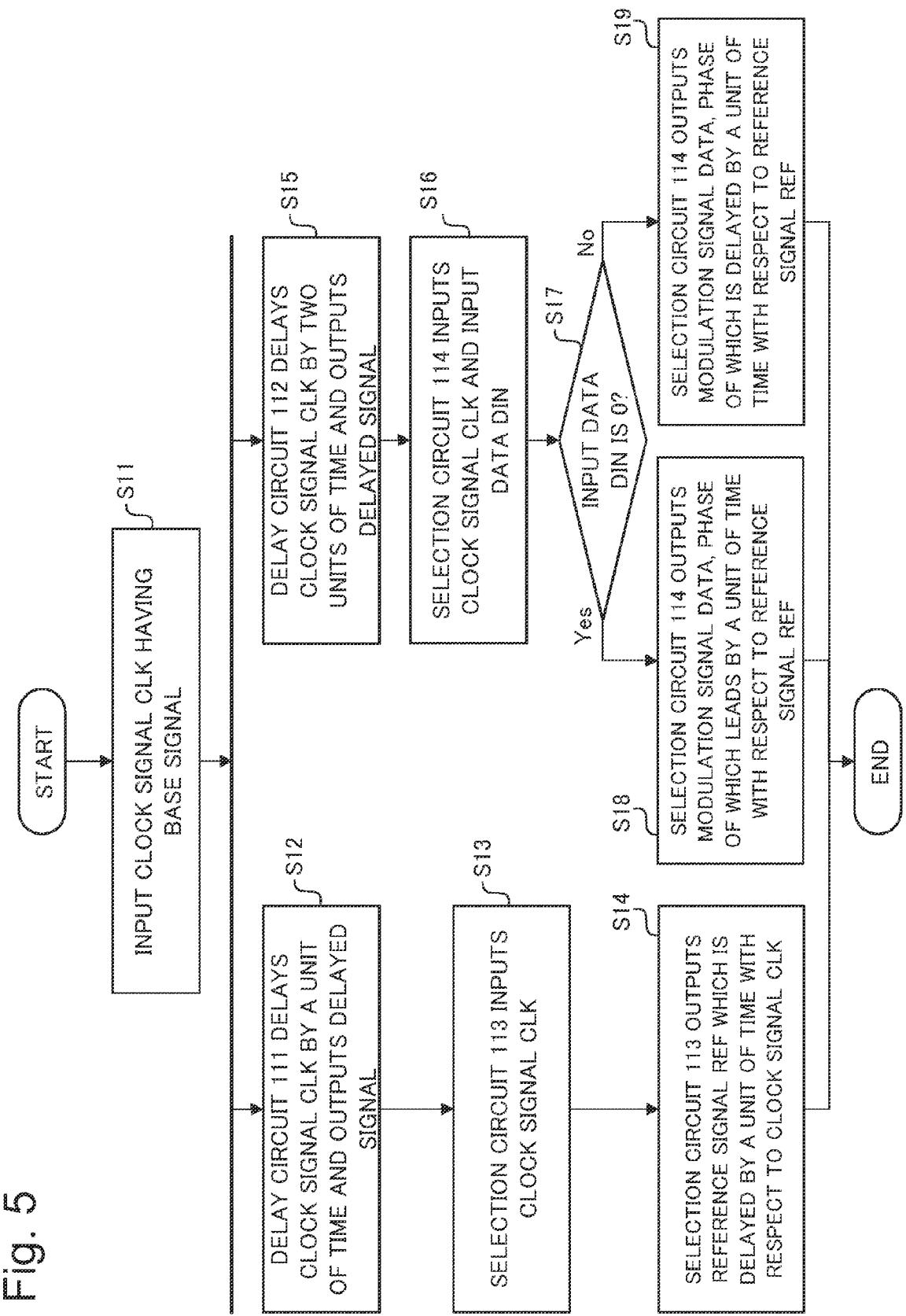
FIG. 5 is a flowchart illustrating an operation of the sending unit of the data transmission system according to the first exemplary embodiment of the present invention.

In FIG. 5, the sending unit 11 inputs the clock signal CLK having a base signal (step S11). The clock signal CLK is input to the sending unit 11 so as to be distributed to the delay units 111 and 112.

The delay unit 111 delays the input clock signal CLK by a unit of time and outputs the delayed signal to the selection circuit 113 (step S12).

The selection circuit 113 inputs the signal output by the delay unit 111 (step S13).

The selection circuit 113 selects the signal input from the delay unit 111 without any change, and outputs the reference signal, which is delayed by a unit of time with respect to the clock signal, to the reference signal transmission line 14 (step S14).

The delay unit 112 delays the input clock signal CLK by two units of time and outputs the delayed signal to the selection circuit 114 (step S15).

The selection circuit 114 inputs the clock signal CLK and the input data DIN (step S16).

The selection circuit 114 determines whether or not the input data DIN is 0 (step S17)

When the input data DIN is 0 (Yes in step S17), the selection circuit 114 outputs the modulation signal DATA the phase of which leads by a unit of time with respect to the reference signal REF to the modulation signal transmission line 15 (step S18).

When the input data DIN is 1 (No in step S17), the selection circuit 114 outputs the modulation signal DATA the phase of which is delayed by a unit of time with respect to the reference signal REF to the modulation signal transmission line 15 (step S19).

An operation of the sending unit 11 has been described above. An operation devised by applying various changes and additions to the above-described operation is also within the scope of the present invention.

(LC Parallel Resonant Circuit)

The reference signal REF and the modulation signal DATA are transmitted to the receiving unit 12 via the reference signal transmission line 14 and the modulation signal transmission line 15, respectively. To each of the reference signal transmission line 14 and the modulation signal transmission line 15, the LC parallel resonant circuit 13 is connected.

The inductor of the LC parallel resonant circuit 13 suppresses peaking which develops on signal waveforms of the reference signal REF and the modulation signal DATA.

(Receiving Unit)

Next, referring to FIG. 6, an operation of the receiving unit 12 will be described.

Figure 6:
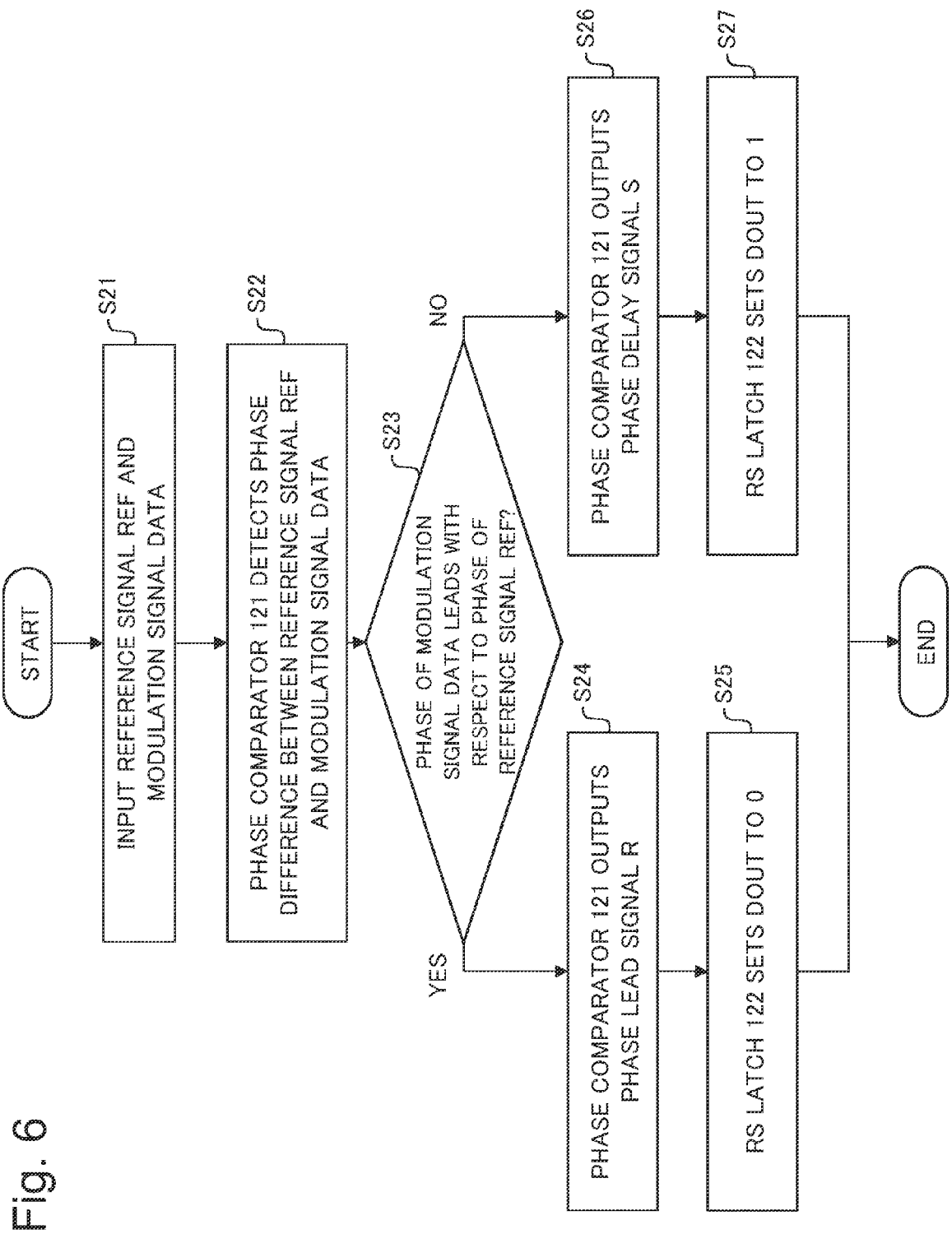
FIG. 6 is a flowchart illustrating an operation of the receiving unit of the data transmission system according to the first exemplary embodiment of the present invention.

In FIG. 6, the receiving unit 12 inputs the reference signal REF and the modulation signal DATA (step S21). The reference signal REF and the modulation signal DATA are, as illustrated in FIG. 4, input to the phase detection unit 121.

The phase detection unit 121 detects a phase difference between the reference signal REF and the modulation signal DATA (step S22).

The phase detection unit 121 determines, based on the detected phase difference between the reference signal REF and the modulation signal DATA, whether or not the phase of the modulation signal DATA leads compared with the phase of the reference signal REF (step S23).

When the phase of the modulation signal DATA leads with respect to the phase of reference signal REF (Yes in step S23), the phase comparator 121 outputs the phase lead signal R to the RS latch 122 (step S24).

The RS latch 122, when the phase lead signal R is input to the reset input, sets the level of the data output terminal DOUT to 0 (step S25).

When the phase of the modulation signal DATA is delayed with respect to the phase of the reference signal REF (No in step S23), the phase comparator 121 outputs the phase lag signal S to the RS latch 122 (step S26).

The RS latch 122, when the phase lag signal S is input to the set input, sets the level of the data output terminal DOUT to 1 (step S27).

It is possible to acquire transmitted data from the levels of the data output terminal DOUT.

The data transmission system according to the first exemplary embodiment has the following advantageous effects.

Firstly, giving information to the phase difference between the reference signal REF and the modulation signal DATA makes it possible to increase a noise margin and to thereby carry out high frequency transmission. As a result, even when a high-frequency band is used for the transmission line, it becomes possible to transmit data accurately without being affected by waveform rounding.

Secondly, in a data transmission system in which information is given to a phase difference, appending an LC parallel resonant circuit, which is a passive circuit, to a transmission line makes it possible to remove signals in an unnecessary frequency band and, at the same time, to suppress signal attenuation at a particular frequency. In particular, providing an LC parallel resonant circuit makes it possible to compensate attenuation caused by using a higher frequency. As a result, it is possible to carry out a noise-resistant and high-quality high-frequency signal transmission.

In general transmission in which information is indicated by binary amplitude, because a signal includes a plurality of frequency elements, when amplitude increases at a specific frequency due to peaking, successive codes is likely to interfere with each other. Thus, it is not possible to apply inductor peaking configured with passive circuits to a transmission path for signal transmission. When the successive codes interfere with each other on a transmission path, it becomes hard to distinguish a potential difference ("0" or "1") of a transmitted signal, causing a case in which data cannot be decoded accurately by a receiving unit. Therefore, it is necessary to amplify an attenuated transmission signal by an active device. However, it then causes an increase in power consumption.

In other words, with the data transmission system according to the first exemplary embodiment of the present invention, it becomes possible to transmit data as a noise-resistant and high-quality high-frequency signal by removing signals in an unnecessary frequency band.

Furthermore, an LC parallel resonant circuit provided in the first exemplary embodiment is a passive circuit which does not require electrical power consumption, leading to a reduction in power consumption. Moreover, it is possible to suppress attenuation of a signal and thereby to lengthen transmission distance.

As described above, by the data transmission system according to the first exemplary embodiment of the present invention, it becomes possible to suppress attenuation of data signal waveforms without consuming extra power in a high-speed transmission with a high-speed clock.

(Variation)

Figure 7:
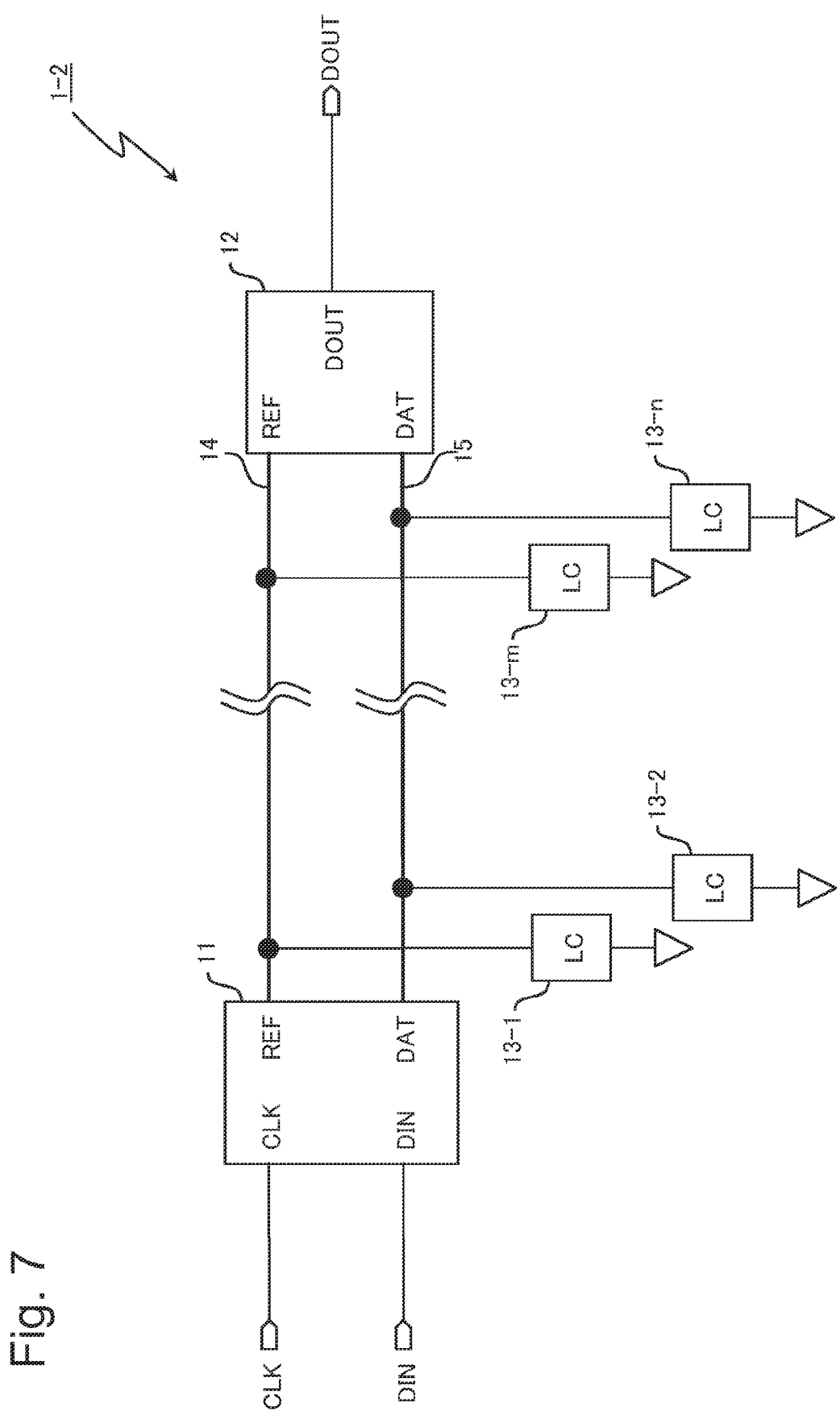
FIG. 7 is a block diagram illustrating a variation of the data transmission system according to the first exemplary embodiment of the present invention.

A data transmission system 1-2, which is a variation of the data transmission system 1 according to the first exemplary embodiment, is illustrated in FIG. 7. The data transmission system 1-2 includes, in addition to the LC parallel resonant circuits 13-1 and 13-2, a plurality of LC parallel resonant circuits 13 including LC parallel resonant circuits 13-$m$ and 13-$n$ (m and n are natural numbers). Although only two pairs of LC parallel resonant circuits 13 are illustrated in FIG. 7, it is assumed that the variation includes a plurality of LC parallel resonant circuits 13. The plurality of LC parallel resonant circuits 13 may be arranged at a plurality of positions including the sending unit 11, receiving unit 12, and transmission lines 14 and 15.

In the data transmission system 1-2 illustrated in FIG. 7, inductor peaking can be applied at a plurality of points by a plurality of LC parallel resonant circuits 13. Thus, even in a situation in which a signal is attenuated or a noise is mixed on the transmission line after inductor peaking is applied somewhere once, it is possible to apply inductor peaking at other points. As a consequence, it becomes possible to transmit a high-quality high-frequency signal over a longer distance.

It is also possible to change a resonant frequency with respect to each of points at which a plurality of LC parallel resonant circuits 13 are arranged. Changing a resonant frequency with respect to each point at which an LC parallel resonant circuit 13 is arranged also makes it possible to transmit signals in a plurality of frequency bands with transmission timings shifted on a single transmission line. Applying a plurality of LC parallel resonant circuits 13 to a single receiving unit 12 makes it possible to receive a signal by using a plurality of frequency bands in the single receiving unit 12.

The data transmission system according to the first exemplary embodiment may be configured to include a sending unit including a plurality of delay circuits 112 and selection circuits 114 and a receiving unit including a plurality of phase comparators 121 and RS latches 122. In this case, it is possible to configure a data transmission system which transmits a plurality of pieces of modulation data DATA with a common reference signal REF.

The data transmission system according to the first exemplary embodiment may also be configured to include a sending unit having the same configuration as the sending unit 11 except the delay circuit 111 and a receiving unit including a phase synchronization circuit. In this variation, the sending unit may output modulation signal DATA including reference signal information to the receiving unit, and the receiving unit may demodulate input data DIN by generating a reference signal REF. This variation may be configured to include a sending unit including a plurality of delay circuits 112 and selection circuits 114 and a receiving unit including a plurality of phase comparators 121 and RS latches 122.

The configurations described above as variations may also be applied to data transmission systems according to the following exemplary embodiments.

Second Exemplary Embodiment

Next, referring to FIG. 8, a data transmission system 2 according to a second exemplary embodiment will be described below. The data transmission system 2 according to the second exemplary embodiment differs from the data transmission system 1 according to the first exemplary embodiment in that the data transmission system 2 also includes a variable delay unit and a control circuit both configured to adjust a phase difference between a reference signal REF and a modulation signal DATA.

Figure 8:
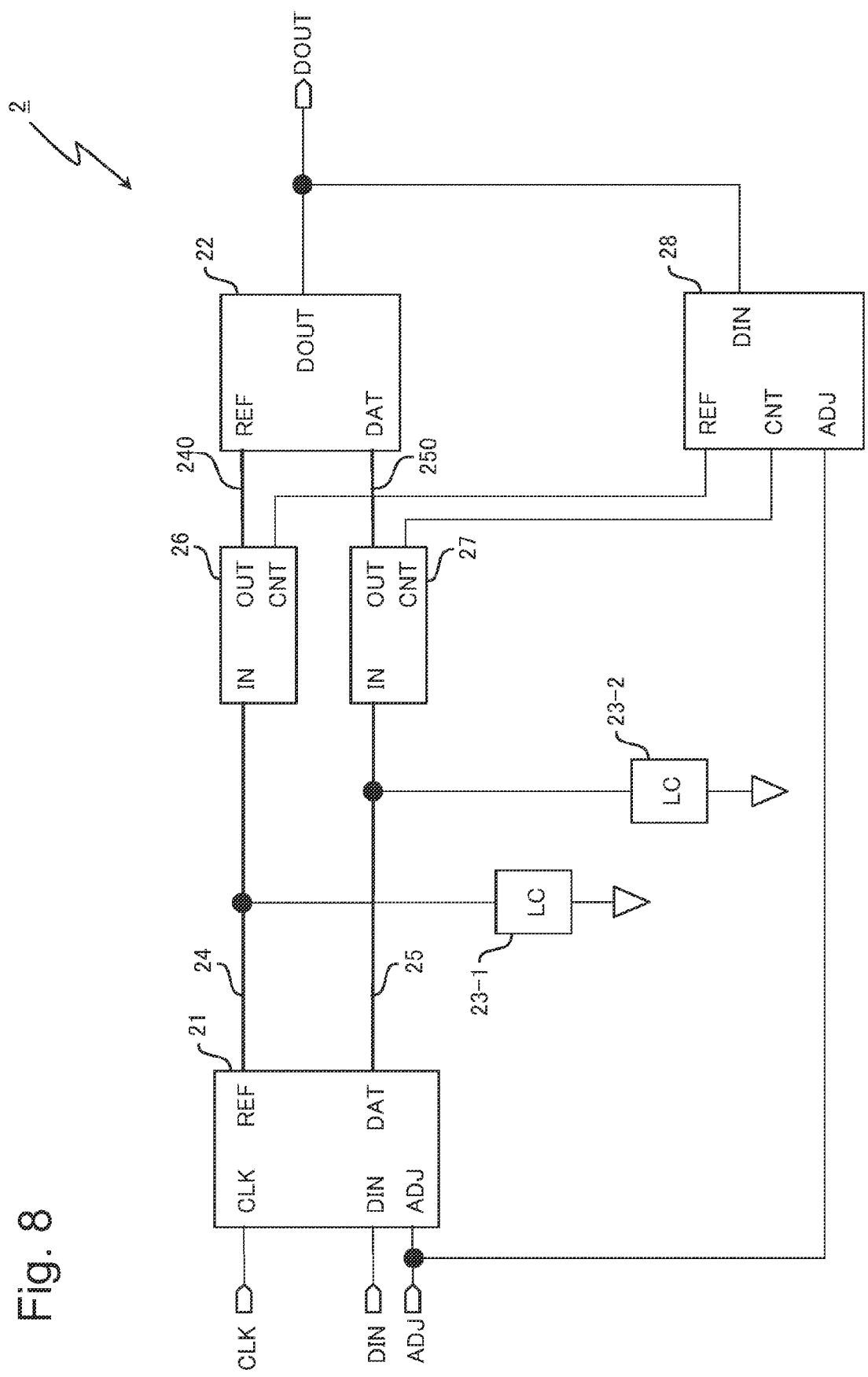
FIG. 8 is a block diagram illustrating a data transmission system according to a second exemplary embodiment of the present invention.

The data transmission system 2 according to the second exemplary embodiment, illustrated in FIG. 8, includes a sending unit 21, a receiving unit 22, and LC parallel resonant circuits 23 (23-1 and 23-2). The data transmission system 2 according to the second exemplary embodiment also includes a transmission line connecting the sending unit 21 to the receiving unit 22. The transmission line includes at least a reference signal transmission line 24 through which the reference signal REF is transmitted and a modulation signal transmission line 25 through which the modulation signal DATA is transmitted.

Because the receiving unit 22 and LC parallel resonant circuit 23 according to the second exemplary embodiment are similar to the receiving unit 12 and LC parallel resonant circuit 13 according to the first exemplary embodiment, respectively, detail description will be omitted in the second exemplary embodiment.

The data transmission system 2 includes variable delay units 26 and 27 on the transmission line and also includes a control circuit 28 configured to control the variable delay units 26 and 27. The variable delay units 26 and 27 are arranged on the reference signal transmission line 24 and modulation signal transmission line 25, respectively. In FIG. 8, the variable delay unit 26 is arranged on the reference signal transmission line 24, and the variable delay unit 27 is arranged on the modulation signal transmission line 25. The variable delay unit 26 and 27 are delay means that function as a variable delay unit in combination.

A section between the variable delay unit 26 and the receiving unit 22 of the reference signal transmission line 24 is also referred to as an adjustment reference signal transmission line 240 because, in an adjustment period, an adjustment reference signal REF0 is transmitted through the section. Similarly, a section between the variable delay unit 27 and the receiving unit 22 of the modulation transmission line 25 is also referred to as an adjustment modulation signal transmission line 250 because, in the adjustment period, an adjustment signal DATA0 is transmitted through the section.

Figure 9:
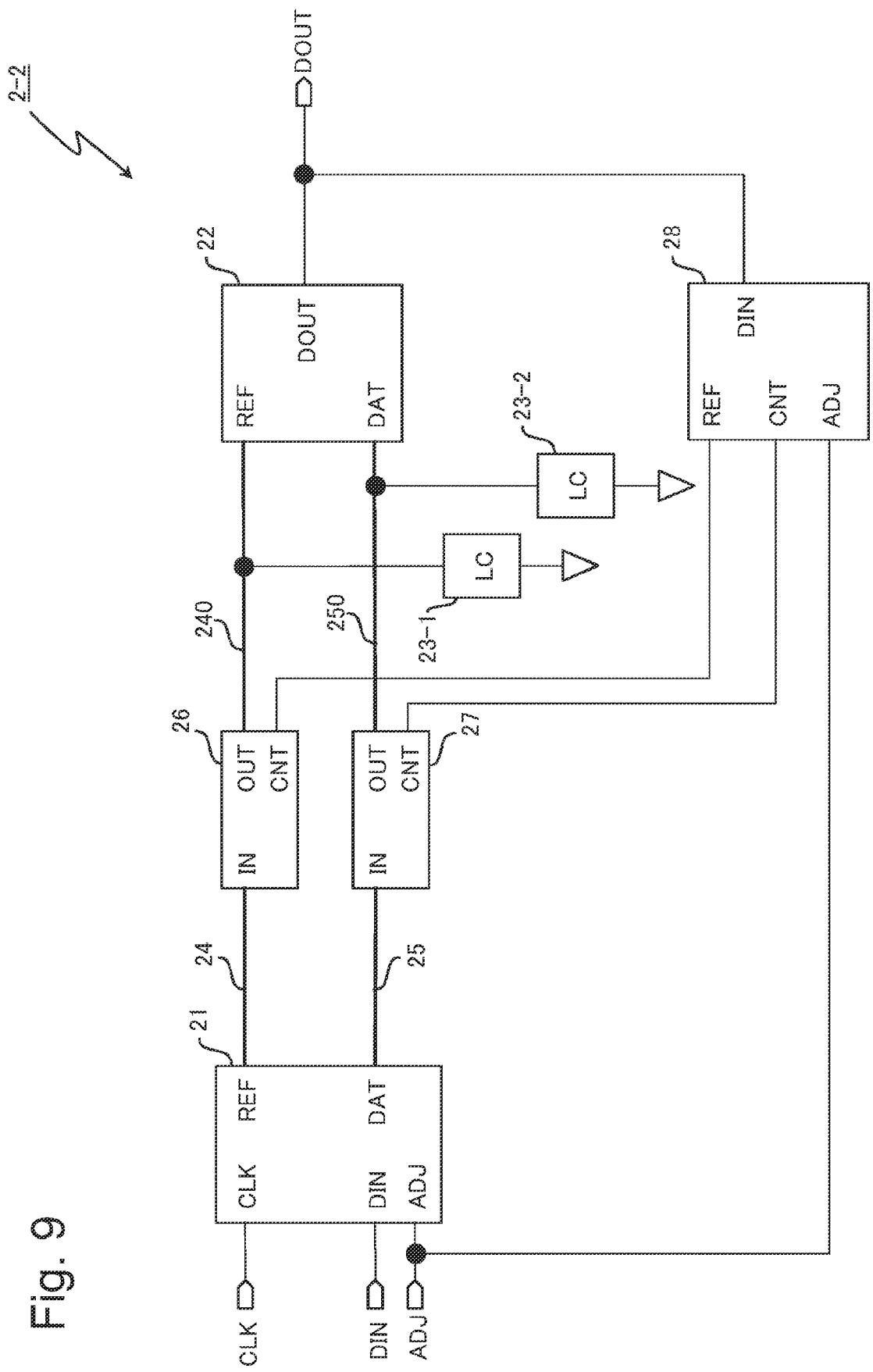
FIG. 9 is a block diagram illustrating a data transmission system according to the second exemplary embodiment of the present invention.

In the second exemplary embodiment, the LC parallel resonant circuit 23 may be arranged between the sending unit 21 and the variable delay units 26 and 27 as illustrated in FIG. 8, or between the variable delay units 26 and 27 and the receiving unit 22 as illustrated in FIG. 9. Although the LC parallel resonant circuit 23 may be arranged between the variable delay units 26 and 27 and the control circuit 28, the arrangement is not preferable.

(Sending Unit)

Figure 10:
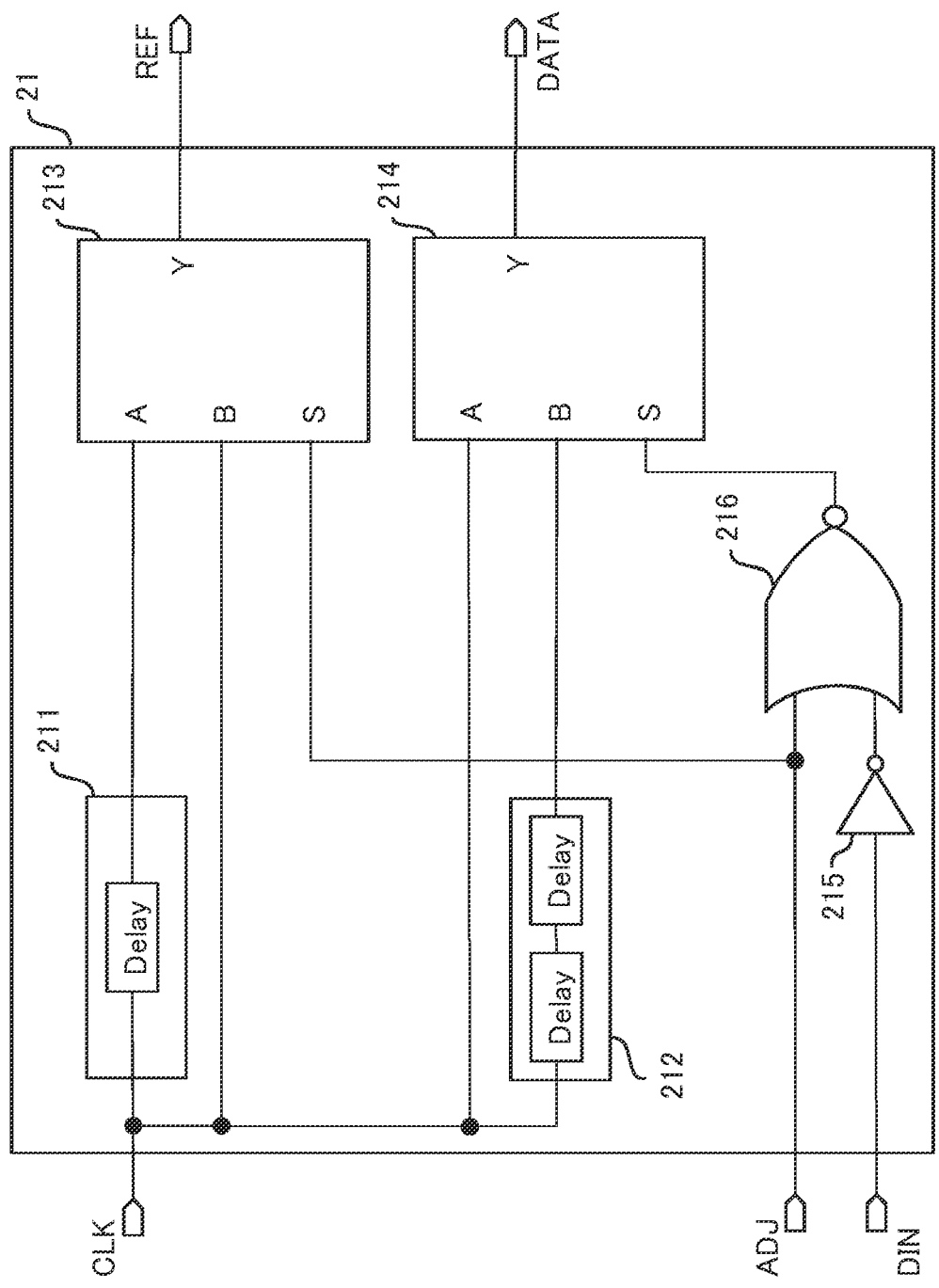
FIG. 10 is a diagram illustrating an example of a circuit configuration of a sending unit of the data transmission system according to the second exemplary embodiment of the present invention.

FIG. 10 is a diagram illustrating an example of the sending unit 21 of the data transmission system 2 according to the second exemplary embodiment as a circuit diagram. The circuit configuration illustrated in FIG. 10 is an example. Any change may be applied to the circuit configuration as long as the below-mentioned operation is carried out.

The sending unit 21 outputs, in the adjustment period during which a phase is adjusted before data transmission, the reference signal REF and the adjustment signal DATA0, which has a certain phase relation with the reference signal REF. The sending unit 21 outputs, in a data transmission period after the adjustment period, the reference signal REF and the modulation signal DATA, which has a phase difference with respect to the reference signal REF in accordance with a value of the input data DIN.

The sending unit 21 includes delay units 211 and 212, selection circuits 213 and 214, an inverter 215, and a NOR circuit 216.

The delay unit 211 delays a clock signal CLK having an externally-input base frequency by a unit of time and outputs the delayed signal.

The delay unit 212 has a delay time of twice as long as the delay time of the delay circuit 211. The delay unit 212 delays the clock signal CLK having an externally-input base frequency by two units of time and outputs the delayed signal.

The inverter 215 inputs the input data DIN and outputs an inverted signal of the input data DIN to a NOR circuit.

The NOR circuit 216 inputs the signal output by the inverter 215 and an adjustment command signal ADJ output by the control circuit 28, produces a negative OR of the input signals, and outputs the result to the selection circuit 214.

The selection circuits 213 and 214 are configured as multiplexers assembled from inverter circuits and NAND circuits.

When the adjustment command signal ADJ is 0, that is, in the data transmission period, the selection circuits 213 and 214 carry out a similar operation to the operation carried out by the selection circuits 113 and 114 of the first exemplary embodiment. The selection circuit 213 selects the reference signal REF at all times. On the other hand, the selection circuit 214 selects the modulation signal DATA the phase of which leads by a unit of time with respect to the reference signal REF when the input data DIN is 0, and selects the modulation signal DATA the phase of which is delayed by a unit of time with respect to the reference signal when the input data DIN is 1.

When the adjustment command signal ADJ is 1 (adjustment period), the selection circuits 213 and 214 carry out a different operation from the operation carried out by the selection circuits 113 and 114 of the first exemplary embodiment. The selection circuit 213 selects the adjustment reference signal REF0. On the other band, the selection circuit 214 selects the adjustment signal DATA0 having the same phase as the reference signal REF.

(Variable Delay Unit)

The variable delay unit is a delay means adjusted by the control circuit 28 so as to maintain the phase relation between the adjustment reference signal REF0 and the adjustment signal DATA0 at the certain relation in the adjustment period.

The variable delay units (26 and 27) are, for example, configured with a circuit combining a plurality of inverters connected in series and a plurality of loads (MOS transistors) to the drains or sources of which capacitors are connected (MOS: Metal Oxide Semiconductor). For example, the variable delay units 26 and 27 may be configured so that the source or drain of an nMOS transistor is connected to a point between the plurality of inverters and the gate is connected so as to be turned on or off by the control signal CNT from the control circuit 28 (n: negative). Because loads of the inverters change in accordance with the nMOS transistors being turned on or off in response to the control signal CNT, it is possible to control an amount of delay of a transmission signal which passes through the plurality of inverters connected in series.

The control circuit 28 is a control means configured to control the variable delay units so as to maintain the phase relation between the adjustment reference signal REF0 and the adjustment signal DATA0 at the certain relation in the adjustment period.

An input DIN of the control circuit 28 is connected to an output DOUT of the receiving unit 22. The control circuit 28 controls the sending unit 21 to output the adjustment reference signal REF0 and adjustment signal DATA0 by outputting the adjustment command signal ADJ to the sending unit 21 in the adjustment period.

The signals output from the variable delay unit are input to the receiving unit 22 as with the first exemplary embodiment, and the input data DIN is output as a data restoration signal DOUT.

Because, in the second exemplary embodiment, as with the first exemplary embodiment, signals outside a particular frequency band are attenuated by the LC parallel resonant circuits 23 (23-1 and 23-2), it is possible to suppress propagation of signals irrelevant to transmission (i.e. noise). By making signals within the particular frequency band distinct, it is possible to reduce attenuation of signals in the particular frequency band compared with a conventional transmission line.

With the second exemplary embodiment, it is possible to reduce variation of delay amount in a circuit or on a transmission line by the adjustment operation which maintains a certain phase difference between the reference signal REF and the modulation signal DATA. Accordingly, it is possible to reduce a skew between the reference signal REF and the modulation signal DATA.

Third Exemplary Embodiment

Next, referring to FIG. 11, a data transmission system 3 according to a third exemplary embodiment will be described below. In the data transmission system 3 according to the third exemplary embodiment, a sending unit outputs a data signal the phase of which is shifted at rising (or falling) edges thereof in accordance with input data and is not shifted at falling (or rising) edges thereof. A receiving unit generates a reference signal from falling (or rising) edges of an input data signal, and restore the input data from a phase difference between the reference signal and the data signal. In other words, the data transmission system 3 according to the third exemplary embodiment differs from the data transmission systems 1 and 2 of the first and second exemplary embodiments in that it is possible to combine transmission lines into a single line because the reference signal need not be transmitted.

Figure 11:
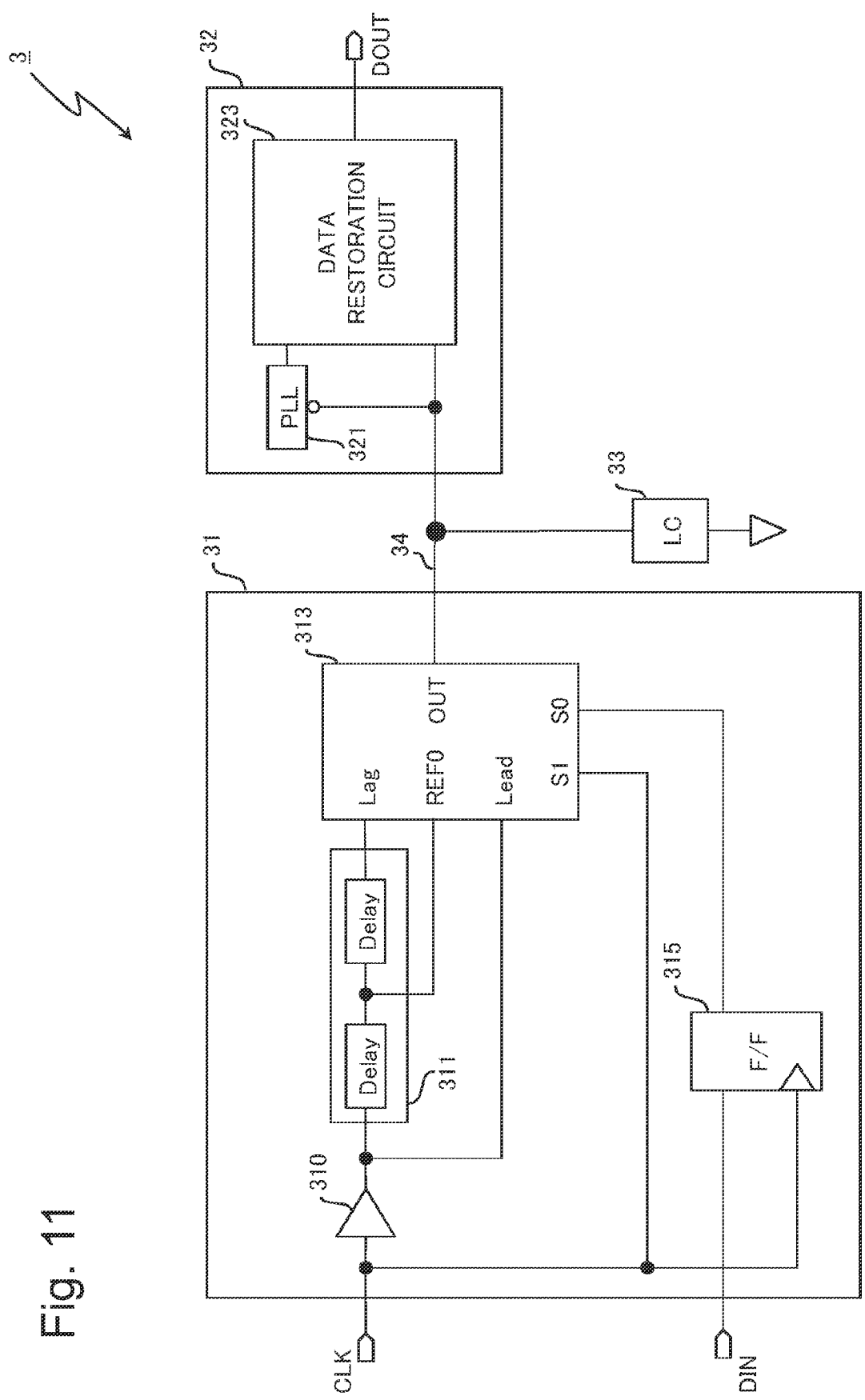
FIG. 11 is a block diagram illustrating a data transmission system according to a third exemplary embodiment of the present invention.

The data transmission system 3 according to the third exemplary embodiment, illustrated in FIG. 11, includes a sending unit 31, a receiving unit 32, and an LC parallel resonant circuit 33. The data transmission system 3 may, as with the data transmission system 1-2 according to the first exemplary embodiment, include a plurality of LC parallel resonant circuits 33.

The data transmission system 3 according to the third exemplary embodiment includes a transmission line 34 which connects the sending unit 31 to the receiving unit 32. The data transmission system 3 can be configured with a single transmission line 34.

(Sending Unit)

The sending unit 31 includes a buffer circuit 310, a delay circuit 311 including two-stage delay units, a selection circuit 313, and a flip-flop (F/F) 315.

The buffer circuit 310 functions as a buffer for timing adjustment. The buffer circuit 310 inputs a clock signal CLK having a base frequency and outputs a signal LEAD which is generated by delaying the input clock signal CLK by a pre-determined time. The signal LEAD output by the buffer circuit 310 is output to the delay circuit 311 and the selection circuit 313.

The delay circuit 311 delays the input signal LEAD by a unit of time at the first delay unit and by another unit of time (two units of time in total) at the second delay unit. The delay circuit 311 outputs a signal LAG which is generated by delaying the input signal LEAD by two units of time and also outputs an adjustment reference signal REF0 which is generated by delaying the signal LEAD by only a unit of time without having the delayed signal go through the second delay unit. The signal LAG and adjustment reference signal REF0, which are output by delay circuit 311, are individually output to the selection circuit 313.

The flip-flop 315 inputs the clock signal CLK having a base frequency and takes in input data DIN at a rising edge of the clock signal CLK. The taken-in input data DIN is supplied to the selection circuit 313 as a selection signal S0.

The selection circuit 313 inputs the signal LEAD, signal LAG, and adjustment reference signal REF0, and outputs a data output signal OUT in accordance with states of the selection signal S0 and a selection signal S (clock signal CLK). The data output signal OUT is transmitted on the transmission line 34 and input to the receiving unit 32.

The data output signal OUT is a signal the phase of which is shifted at rising edges thereof in accordance with a data value of the input data DIN and is not shifted at falling edges thereof but in synchronization with falling edges of the adjustment reference signal REF0. The data output signal OUT may be a signal the phase of which is not shifted at rising edges thereof and is shifted at falling edges thereof in accordance with a data value of the input data DIN.

In the third exemplary embodiment, as with the first and second exemplary embodiments, signals outside a particular frequency band are attenuated by the LC parallel resonant circuit 33.

(Receiving Unit)

The receiving unit 32 includes a PLL circuit 321 and a data restoration circuit 323 (PLL: Phase-Locked Loop). The reception unit 32 inputs the data output signal OUT output by the transmission unit 31 as a reception signal IN1.

The PLL circuit 321 is a phase synchronization circuit which generates a reference signal REF1 by using falling (or rising) edges of the reception signal IN1 which synchronize with falling (or rising) edges of the adjustment reference signal REF0.

The PLL circuit 321 generates the reference signal REF1 with a duty ratio of 50%, which synchronizes with, for example, falling (or rising) edges of the reception signal IN1, and outputs the generated reference signal REF1 to the data restoration circuit 323. The duty ratio of the reference signal REF1 the PLL circuit 321 generates may not be 50%.

The data restoration circuit 323 receives the reference signal REF1 and reception signal IN1. The data restoration circuit 323 detects phase differences between the reference signal REF1 and the reception signal IN1 at rising (or falling) edges of the reference signal REF1. The data restoration circuit 323 outputs a data restoration signal DOUT, which is generated by restoring the input data DIN based on the detected phase differences between the reference signal REF1 and the reception signal IN1.

In the third exemplary embodiment, as with the first and second exemplary embodiments, because signals outside a particular frequency band are attenuated by the LC parallel resonant circuit 33, it is possible to suppress propagation of signals irrelevant to transmission (i.e. noise). Moreover, by making signals within the particular frequency band distinct, it is possible to reduce attenuation of signals in the particular frequency band compared with conventional transmission lines.

In the third exemplary embodiment, a phase at one of a rising edge and a falling edge of the data output signal OUT is synchronized with the adjustment reference signal REF0 and is thus not shifted, and a phase at the other is shifted in accordance with a data value of the input data DIN. Because the phase at either a rising edge and a falling edge of the data output signal OUT is kept constant at all times, the PLL circuit (phase synchronization circuit) is able to generate a stable reference signal REF1 at all times for any codes arriving successively. Accordingly, the data transmission system is never constrained by a condition in a data coding method applied to input data.

Fourth Exemplary Embodiment

Next, a data transmission system 4 according to a fourth exemplary embodiment of the present invention will be described below. In the data transmission system 4 according to the fourth exemplary embodiment, a stub which is provided to a transmission line is used as a means to apply inductor peaking.

Figure 12:
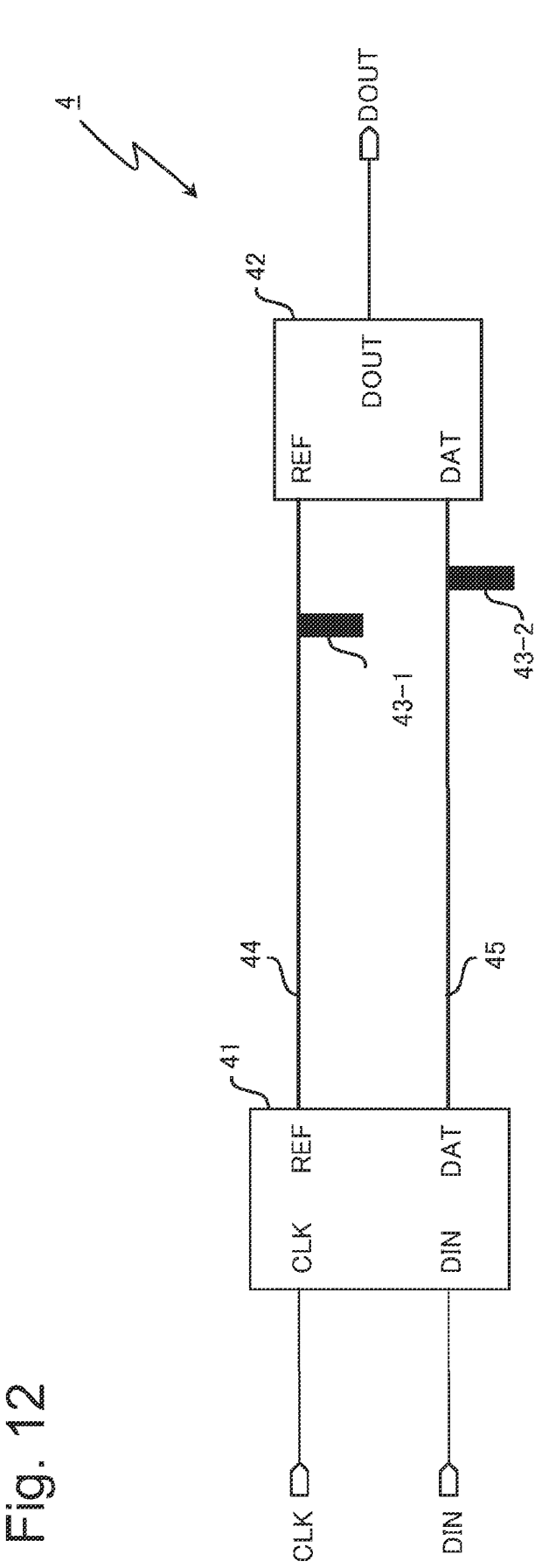
FIG. 12 is a block diagram illustrating a data transmission system according to a fourth exemplary embodiment of the present invention.

As illustrated in FIG. 12, the data transmission system 4 according to the fourth exemplary embodiment includes a sending unit 41, a receiving unit 42, stubs 43 (43-1 and 43-2), a reference signal transmission line 44, and a modulation signal transmission line 45. The stubs 43 include the stub 43-1 on the reference signal transmission line 44 and the stub 43-2 on the modulation signal transmission line 45, which are arranged in a pair. A plurality of stubs 43 may be arranged.

In the data transmission system 4, the sending unit 41, receiving unit 42, reference signal transmission line 44, and modulation signal transmission line 45 have similar configurations and functions to those of the data transmission systems according to the first to third exemplary embodiments, respectively, and thus detail description will be omitted.

The stubs 43 are distributed constant lines, which are connected to the transmission lines in parallel. For example, a portion branching off from the transmission line in a stump-like manner may also function as the stub 43. The stub 43 may be an open circuit stub or a short circuit stub. A bus coupler which has part of functions of the stub 43 may be inserted in the transmission line.

It is possible to determine inductance L and capacitance based on a relation between stub length l and wavelength $\lambda$ of a transmission signal.

Input impedance Zin of a short circuit stub is expressed by Eqn. 1. In the equation, $Z_0$ refers to impedance of the transmission line.

$$Zin = jZ_0 \tan(2\pi l/\lambda) \quad (1)$$

A short circuit stub functions as an inductor when the stub length l is shorter than $\lambda/4$, and functions as a capacitor when the stub length l is in a range from $\lambda/4$ to $\lambda/2$.

Input impedance Zin of an open circuit stub is expressed by Eqn. 2.

$$Zin = Z_0/\{j \tan(2\pi l/\lambda)\} \quad (2)$$

An open circuit stub functions as a capacitor when the stub length l is shorter than $\lambda/4$, and functions as an inductor when the stub length l is in a range from $\lambda/4$ to $\lambda/2$.

When the stub length l is set to one fourth of the wavelength $\lambda$ of a transmission signal, it is possible to make a short circuit stub function as an LC parallel resonant circuit and an open circuit stub function as an LC series resonant circuit.

In the fourth exemplary embodiment, a wavelength $\lambda$ of a transmission signal and a length l of the stub 43 may be determined in accordance with the capacitance and impedance of the transmission line.

Fifth Exemplary Embodiment

Next, a data transmission system according to a fifth exemplary embodiment of the present invention will be described below. In the data transmission system according to the fifth exemplary embodiment, an active circuit is used as a means to apply inductor peaking. Although an active circuit consumes electric power in itself, the active circuit described in the fifth exemplary embodiment is a low power consumption circuit.

Figure 13:
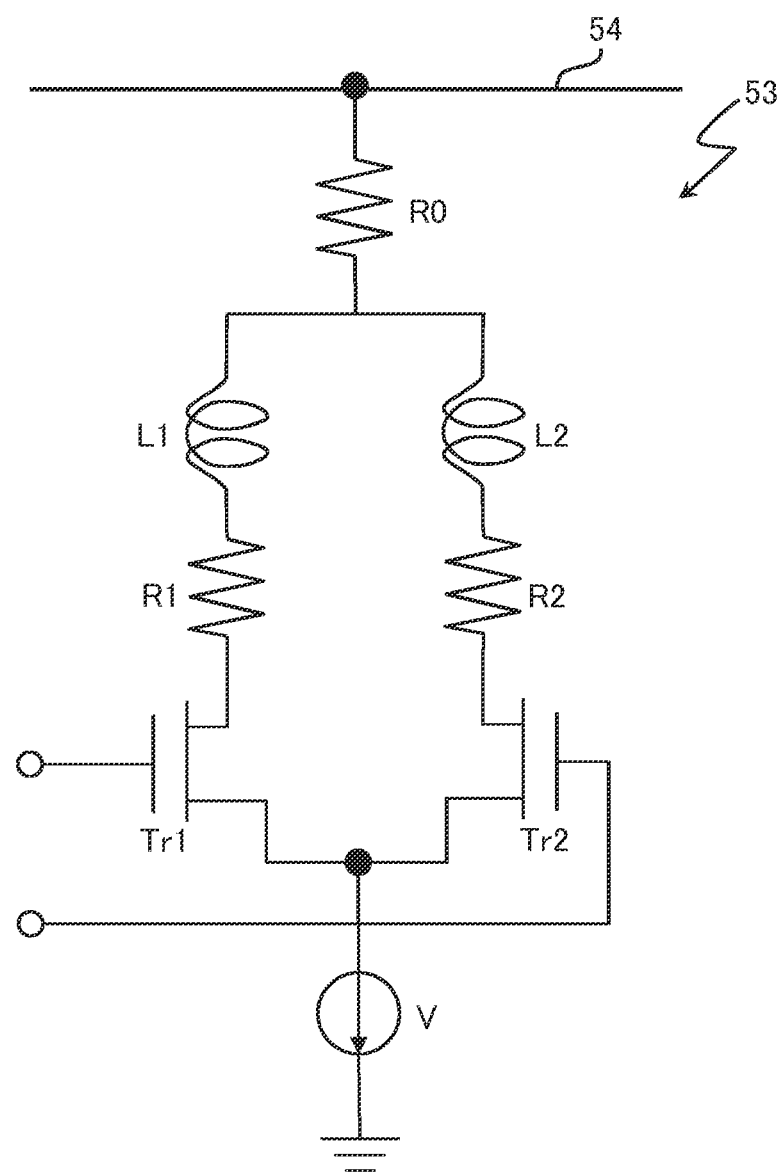
FIG. 13 is a circuit diagram illustrating an active circuit connected to a data transmission system according to a fifth exemplary embodiment of the present invention.

The data transmission system according to the fifth exemplary embodiment additionally includes an active circuit as, for example, illustrated in FIG. 13. The active circuit 53 in FIG. 13 has a configuration including inductors (L1 and L2), resistors (R0, R1, and R2), transistors (Tr1 and Tr2), and a current source V. However. FIG. 13 illustrates an example. The numbers and arrangement positions of the inductors, resistors, transistors, and current source may be changed arbitrarily.

The active circuit 53 may be inserted in any of a sending unit, a receiving unit, and transmission lines but it is preferable that the active circuit 53 is inserted in each of the transmission lines, through which a reference signal REF and a modulation signal DATA are transmitted, in a symmetric manner. FIG. 13 illustrates an example in which an active circuit 53 is connected to the transmission line 54.

The active circuit 53 functions as inductor peaking. It is possible to adjust a frequency band to be amplified by changing insertion positions of resistors.

For example, when the inductors L1 and L2 are connected to the transmission line 54 without using the resistor R0 in FIG. 13, amplification for a wide bandwidth, suitable for a data buffer, is achieved. When only the resistor R0 is used without using the resistors R1 and R2, amplification suitable for a high frequency signal with a narrow bandwidth is achieved. As illustrated in FIG. 13, when all the resistors R0, R1 and R2 are used, amplification suitable for a high frequency signal with an intermediate frequency bandwidth is achieved.

Example

Figure 14:
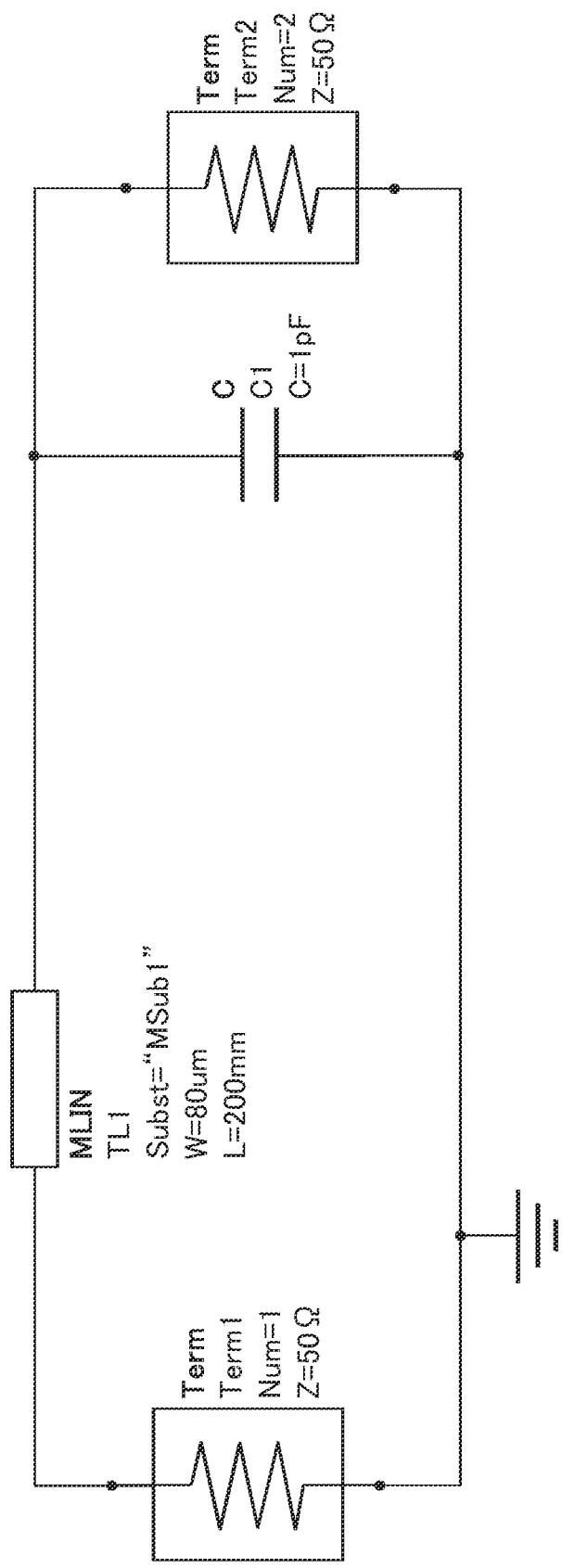
FIG. 14 is a circuit diagram used in a simulation of a conventional transmission line.
Figure 15:
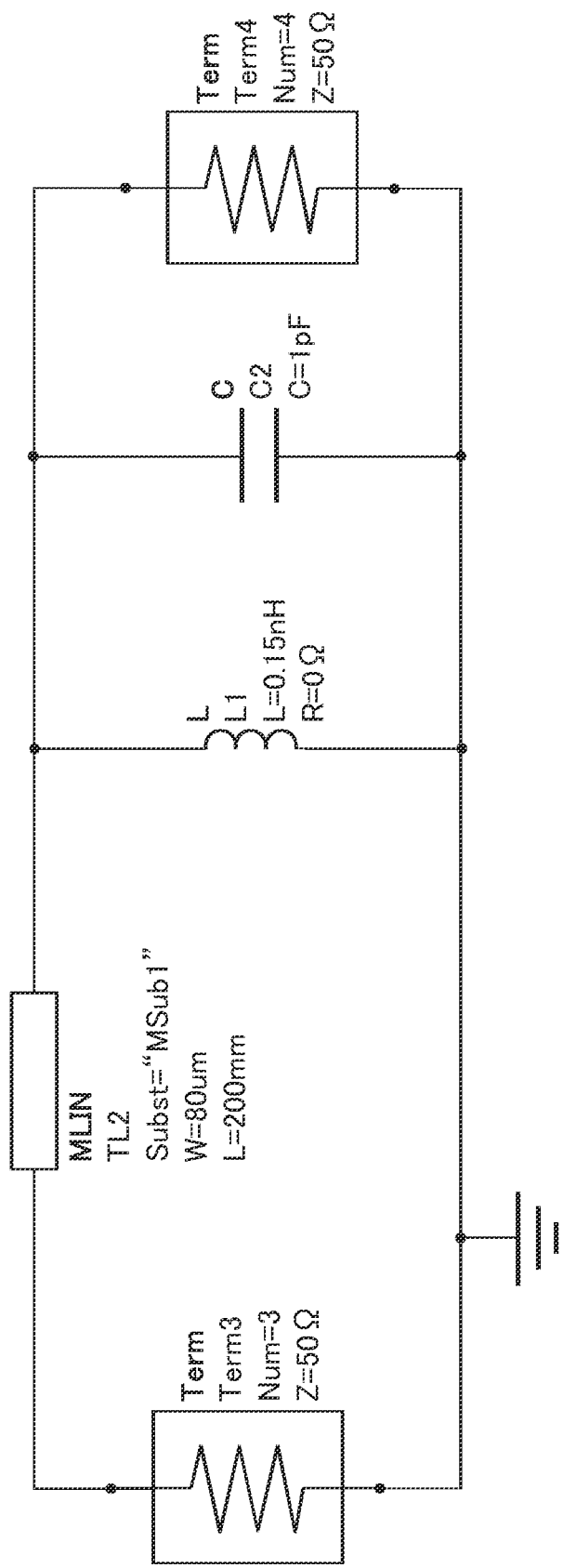
FIG. 15 is a circuit diagram used in simulations of transmission lines according to the exemplary embodiments of the present invention.
Figure 16:
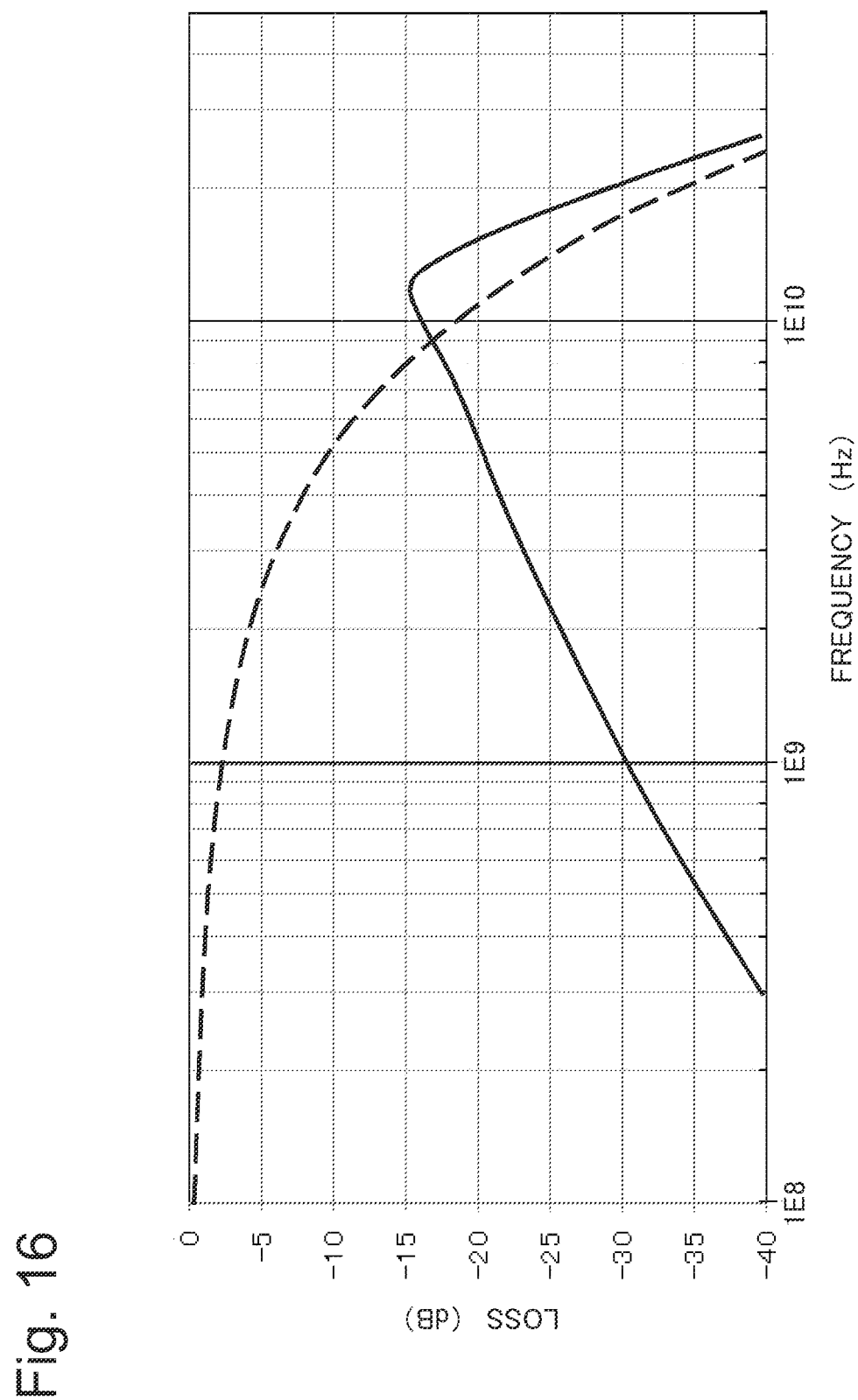
FIG. 16 is a graph illustrating simulation results of the conventional transmission line and the transmission lines according to the exemplary embodiments of the present invention.
Figure 17:
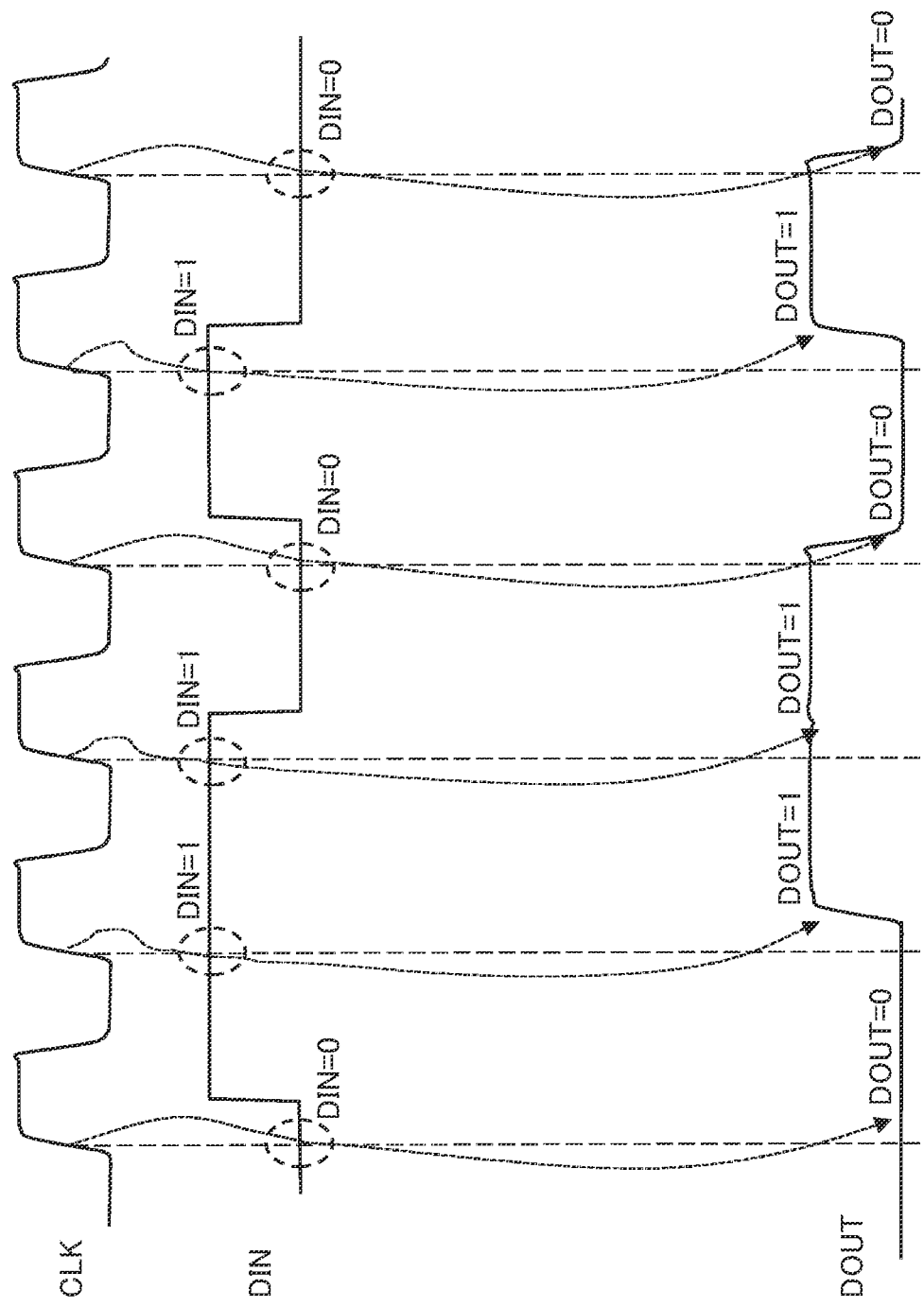
FIG. 17 is a diagram illustrating an example of data transmission waveforms which propagate through a conventional transmission line.

Examples according to the exemplary embodiments of the present invention will be described below. FIGS. 14 and 15 illustrate circuits for simulations of a transmission line. FIG. 16 is a graph illustrating results of the simulations.

Figure 18:
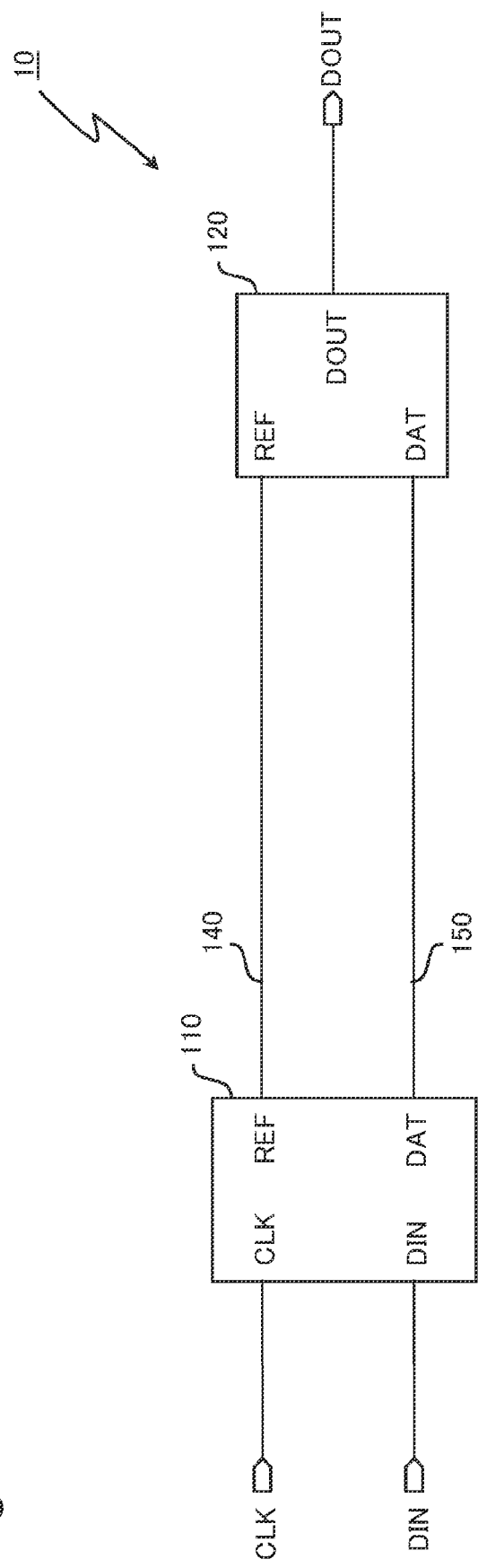
FIG. 18 is a block diagram illustrating a data transmission system according to Patent Literature 1.
Figure 19:
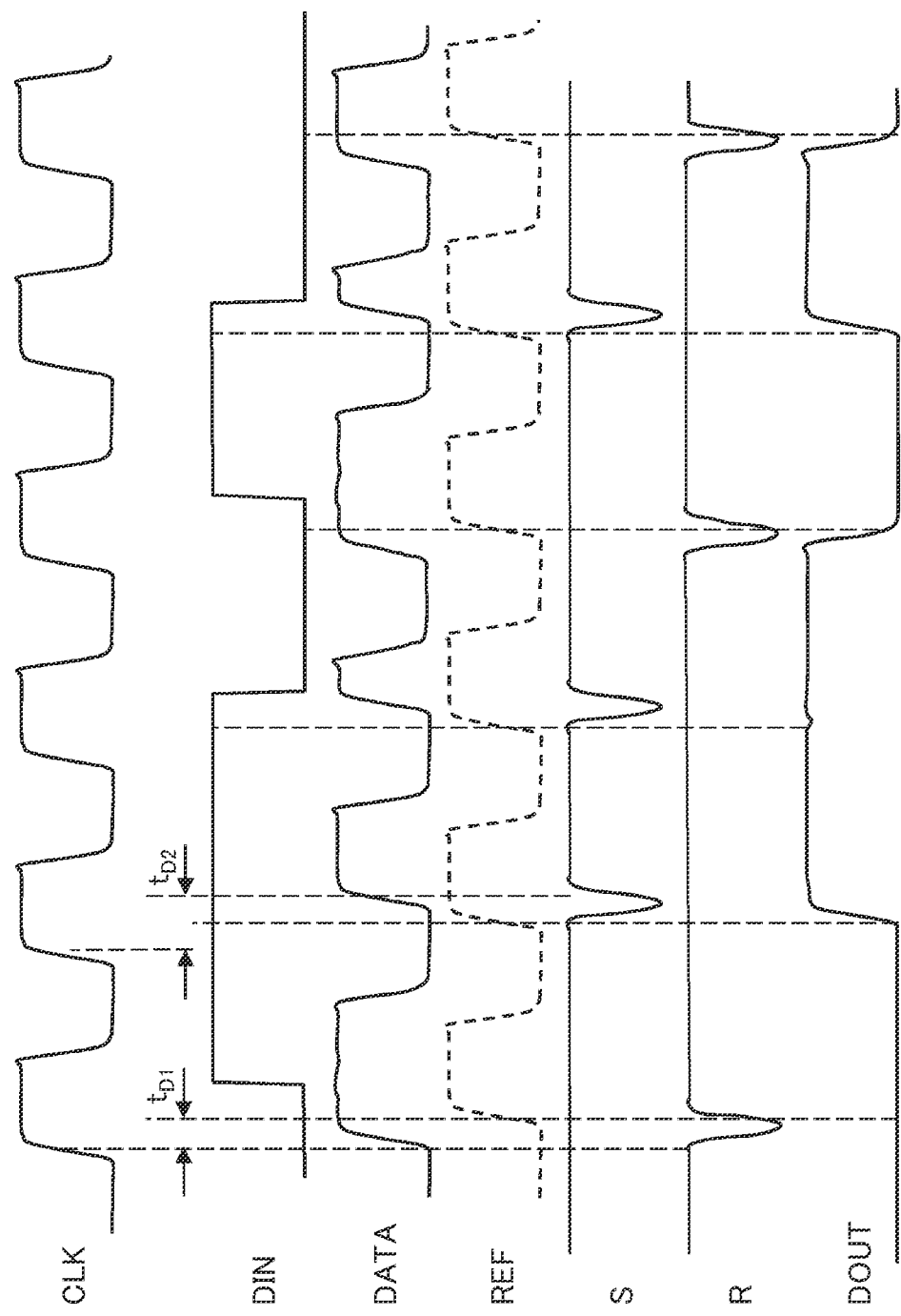
FIG. 19 is a diagram illustrating an example of data transmission waveforms which propagate through a transmission line of the data transmission system according to Patent Literature 1.

FIG. 14 illustrates a configuration of a transmission line to which an LC parallel resonant circuit is not applied, which corresponds to a configuration of Patent Literature 1 illustrated in FIG. 18. The transmission line illustrated in FIG. 14 has a FR4-corresponding microstrip line structure, with both ends terminated with 50Ω and having a capacitor of 1 pF to represent parasitic capacitance on the reception side (FR4: Flame Retardant Type 4). As parameters of the microstrip line structure, the transmission line has a width W of 80 μm, length L of 200 mm, and thickness t of 32 μm, and the substrate has a thickness H of 40 μm.

FIG. 15 illustrates a configuration of a transmission line to which an LC parallel resonant circuit is applied, which corresponds to the configuration of the first exemplary embodiment of the present invention illustrated in FIG. 1. The transmission line in FIG. 15 has the same configuration as the transmission line illustrated in FIG. 14 except that an inductor of 0.15 nH is provided in parallel to the parasitic capacitance.

In FIG. 16, a broken line indicates a simulation result for the transmission line to which no LC parallel resonant circuit is connected (FIG. 14), and a solid line indicates a simulation result for the transmission line to which an LC parallel resonant circuit is connected (FIG. 15).

For the configuration in FIG. 14 (Patent Literature 1), the higher the frequency of a signal becomes, the larger attenuation (LOSS) the signal suffers from.

On the other hand, for the configuration in FIG. 15 (the first exemplary embodiment of the present invention), attenuation at a particular frequency (12.5 GHz in this example) is less than that of the configuration in FIG. 14 due to appending an LC parallel resonant circuit. In the configuration in FIG. 15, the fact that signals outside a frequency band in use is attenuated indicates that propagation of signals irrelevant to transmission (i.e. noise) is suppressed.

The resonant frequency F of an LC parallel resonant circuit is, as expressed by Eqn. 3, determined by only inductance L and capacitance C.

$$F = \frac{1}{2\pi\sqrt{LC}} \ldots$$

When an LC parallel resonant circuit is configured with an inductor and a capacitor, inductance L of the inductor and capacitance C of the capacitor may be determined in accordance with a frequency to be used.

Examples according to the exemplary embodiments of the present invention have been described above.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A data transmission system comprising:
   a sending unit that inputs a clock signal and a data signal and outputs a reference signal which is generated by delaying the input clock signal and a modulation signal which is either a signal the phase of which is shifted with respect to the reference signal in accordance with a state of the input data signal or the clock signal;

a transmission unit that inputs the reference signal and the modulation signal which are output by the sending unit and transmits the input reference signal and the input modulation signal;

a peaking unit that is arranged on transmission paths for the reference signal and the modulation signal and suppresses a development of peaking by applying inductor peaking to the signals on the transmission paths;

a receiving unit that inputs the reference signal and the modulation signal via the transmission unit, demodulates the data signal by detecting a phase difference between the input reference signal and the input modulation signal, and outputs information on the data signal; and a control unit that inputs an output signal of the receiving unit and controls phase differences between at least two signals input to the receiving unit in an adjustment period during which phases are adjusted before data transmission; and a delay unit that outputs different signals in a data transmission period and the adjustment period in response to control by the control unit, wherein the control unit, in the adjustment period, outputs to the sending unit an adjustment command signal which commands output, to the transmission path, of an adjustment reference signal, which is a reference signal in the adjustment period, and an adjustment signal, which has a certain phase relation with the adjustment reference signal, and controls the delay unit so that a phase difference between the adjustment reference signal and the adjustment signal which are input to the delay unit is in a certain relation, the sending unit outputs the adjustment reference signal and the adjustment signal to the delay unit in response to the adjustment command signal, and the delay unit, in response to the control by the control unit, outputs the adjustment reference signal and the adjustment signal in the adjustment period and outputs the reference signal and the modulation signal in the data transmission period.

2. The data transmission system according to claim 1, wherein an LC parallel resonant circuit is used as the peaking unit.

3. The data transmission system according to claim 1, wherein a stub is used as the peaking unit.

4. The data transmission system according to claim 1, wherein an active circuit is used as the peaking unit.

5. The data transmission system according to claim 1, wherein the sending unit applies inductor peaking to the generated reference signal and modulation signal.

6. The data transmission system according to claim 1, wherein the receiving unit applies inductor peaking to the received reference signal and modulation signal.

7. A data transmission system comprising:

a sending unit that inputs a clock signal and a data signal and outputs a reference signal which is generated by delaying the input clock signal and a modulation signal which is either a signal the phase of which is shifted with respect to the reference signal in accordance with a state of the input data signal or the clock signal;

a transmission unit that inputs the reference signal and the modulation signal which are output by the sending unit and transmits the input reference signal and the input modulation signal;

a peaking unit that is arranged on transmission paths for the reference signal and the modulation signal and suppresses a development of peaking by applying inductor peaking to the signals on the transmission paths; and a receiving unit that inputs the reference signal and the modulation signal via the transmission unit, demodulates the data signal by detecting a phase difference between the input reference signal and the input modulation signal, and outputs information on the data signal, wherein the sending unit comprises:

a first delay circuit that inputs the clock signal, delays a phase of the input clock signal by a unit of time, and outputs the delayed clock signal;

a first selection circuit that inputs a signal output by the first delay circuit, selects the signal output by the first delay circuit, and outputs the selected signal as the reference signal;

a second delay circuit that inputs the clock signal, delays a phase of the input clock signal by two units of time, and outputs the delayed clock signal;

a second selection circuit that inputs an output signal of the second delay circuit, the clock signal, and the data signal, selects either the output signal of the second delay circuit or the clock signal in accordance with the data signal, and outputs the selected signal as the modulation signal;

a buffer circuit that inputs the clock signal and outputs a delay signal which is generated by delaying the input clock signal by a predetermined time;

a delay circuit that inputs the delay signal output by the buffer circuit and outputs a signal which is generated by delaying the input delay signal by a unit of time and a signal which is generated by delaying the input delay signal by two units of time;

a flip-flop that inputs the clock signal and the data signal and outputs the data signal acquired in accordance with the input clock signal; and a selection circuit that inputs the delay signal, the signal generated by delaying the delay signal by a unit of time, and the signal generated by delaying the delay signal by two units of time, generates an output signal the phase of which is, depending on states of the clock signal and the data signal, not shifted at one edge and shifted at the other edge in accordance with the data signal, and outputs the generated output signal to the transmission path, and the transmission unit comprises:

a reference signal transmission line that transmits the reference signal; and a modulation signal transmission line that transmits the modulation signal, the receiving unit comprises:

a phase comparison circuit that inputs the reference signal and the modulation signal, detects the phase difference between the reference signal and the modulation signal, outputs a phase lead detection signal with a pulse width equivalent to the phase difference when a phase of the modulation signal leads with respect to a phase of the reference signal, and outputs a phase lag detection signal with a pulse width equivalent to the phase difference when a phase of the modulation signal is delayed with respect to a phase of the reference signal;

a latch unit that inputs either the phase lead detection signal or the phase lag detection signal which are output by the phase comparison circuit, and includes a terminal the state of which changes in accordance with the input signal;

a phase synchronization circuit that generates the reference signal from the one edge of the received output signal; and a data restoration circuit that demodulates the data signal based on a phase difference between the reference signal generated from the one edge of the output signal and the other edge of the output signal, and at least one peaking unit is provided on the transmission paths including the reference signal transmission line and the modulation signal transmission line.

* * * * *